US012548946B2

(12) United States Patent
Yasuda

(10) Patent No.: US 12,548,946 B2
(45) Date of Patent: Feb. 10, 2026

(54) CABLE HOLDING MEMBER AND CABLE CONNECTOR DEVICE INCLUDING CABLE HOLDING MEMBER

(71) Applicant: HIROSE ELECTRIC CO., LTD., Kanagawa (JP)

(72) Inventor: Makoto Yasuda, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 398 days.

(21) Appl. No.: 18/312,357

(22) Filed: May 4, 2023

(65) Prior Publication Data

US 2023/0369802 A1 Nov. 16, 2023

(30) Foreign Application Priority Data

May 11, 2022 (JP) ................................ 2022-078005

(51) Int. Cl.
*H01R 13/58* (2006.01)

(52) U.S. Cl.
CPC ................................ *H01R 13/5804* (2013.01)

(58) Field of Classification Search
CPC .. H01R 4/2445; H01R 4/2466; H01R 4/2433; H01R 4/183; H01R 4/24; H01R 4/62; H01R 13/5825; H01R 13/506; H01R 13/6581; H01R 13/6275; H01R 13/6463; H01R 13/6471; H01R 13/38
(Continued)

(56) References Cited

U.S. PATENT DOCUMENTS 4,537,456 A * 8/1985 Brown ................. H01R 4/2466 439/404
6,283,793 B1 9/2001 Nakata
(Continued)

FOREIGN PATENT DOCUMENTS

JP S58216373 A 12/1983
JP H08124605 A 5/1996
(Continued)

OTHER PUBLICATIONS

Japanese Office Action (JPOA) mailed on Dec. 4, 2025 for Japanese Patent Application No. 2022-078005 and its English machine translation.

*Primary Examiner* — Tulsidas C Patel
*Assistant Examiner* — Carlos E Lopez-Pagan
(74) *Attorney, Agent, or Firm* — RANKIN, HILL & CLARK LLP

(57) ABSTRACT

Provided is a cable holding member including: a main body; a through-hole; and a cover portion, wherein the through-hole is configured to allow a cable to be inserted therethrough the main body, a part of the cover portion is configured to, upon the cover portion being bent relative to the main body, be capable of covering a plane intersecting with a direction where the cable is inserted, at an opening end face of an opening portion of the through-hole, the main body includes a latch portion, the cover portion includes a cantilever elastic piece having a latched portion, and it is configured in such a manner that upon the cover portion being bent relative to the main body, the elastic piece is elastically displaced at least in a direction along the direction where the cable is inserted, and the latched portion is capable of being latched to the latch portion.

9 Claims, 22 Drawing Sheets

(58) Field of Classification Search
USPC .................................................. 439/460–469
See application file for complete search history.

(56) References Cited

U.S. PATENT DOCUMENTS

| | | | | |
|---|---|---|---|---|
| 2003/0181093 | A1* | 9/2003 | Negishi ................ | H01R 4/2433 439/404 |
| 2009/0186523 | A1* | 7/2009 | Campbell .......... | H01R 13/4365 29/428 |
| 2016/0118745 | A1* | 4/2016 | Droesbeke ........... | G02B 6/3817 439/352 |
| 2019/0237898 | A1 | 8/2019 | Naganuma | |
| 2020/0044395 | A1* | 2/2020 | Naganuma ......... | H01R 13/6463 |

FOREIGN PATENT DOCUMENTS

| | | | |
|---|---|---|---|
| JP | 11-224723 | A | 8/1999 |
| WO | 2018/016389 | A1 | 1/2018 |

* cited by examiner

CABLE HOLDING MEMBER AND CABLE CONNECTOR DEVICE INCLUDING CABLE HOLDING MEMBER

CROSS-REFERENCE TO RELATED APPLICATION

This application claims priority from Japanese Patent Application No. 2022-078005 filed with the Japan Patent Office on May 11, 2022, the entire content of which is hereby incorporated by reference.

BACKGROUND

1. Technical Field

The present disclosure relates to a cable holding member, and a cable connector device including a cable holding member.

2. Description of the Related Art

For example, a cable connector device, that is, a terminal unit, which is disclosed in JP-A-11-224723, includes a holding block made of an insulating material, which holds a shielded cable being a cable, as a cable holding member. Furthermore, the terminal unit includes an insulated block on which a terminal is mounted, and a shielding member that covers the outer sides of the insulated block and the holding block. The shielded cable includes an inner conductor, and an insulating material that covers the inner conductor as in a general cable.

SUMMARY

A cable holding member according to an embodiment of the present disclosure includes: an insulated main body; a through-hole; a bend portion; and an insulated cover portion. In the cable holding member, the through-hole is configured to allow a cable to be inserted therethrough from one end side toward the other end side of the main body, the cover portion is configured to be bendable along the bend portion relative to the main body, at least a part of the cover portion is configured to, upon the cover portion being bent relative to the main body, be capable of covering a plane intersecting with a direction where the cable is inserted, at an opening end face of an opening portion of the through-hole, the opening end face being located on the other end side, or a vicinity thereof, the main body includes a latch portion, the cover portion includes a cantilever elastic piece having a latched portion, and it is configured in such a manner that upon the cover portion being bent relative to the main body, the elastic piece is elastically displaced at least in a direction along the direction where the cable is inserted, and the latched portion is capable of being latched to the latch portion.

DETAILED DESCRIPTION

Figure 1:
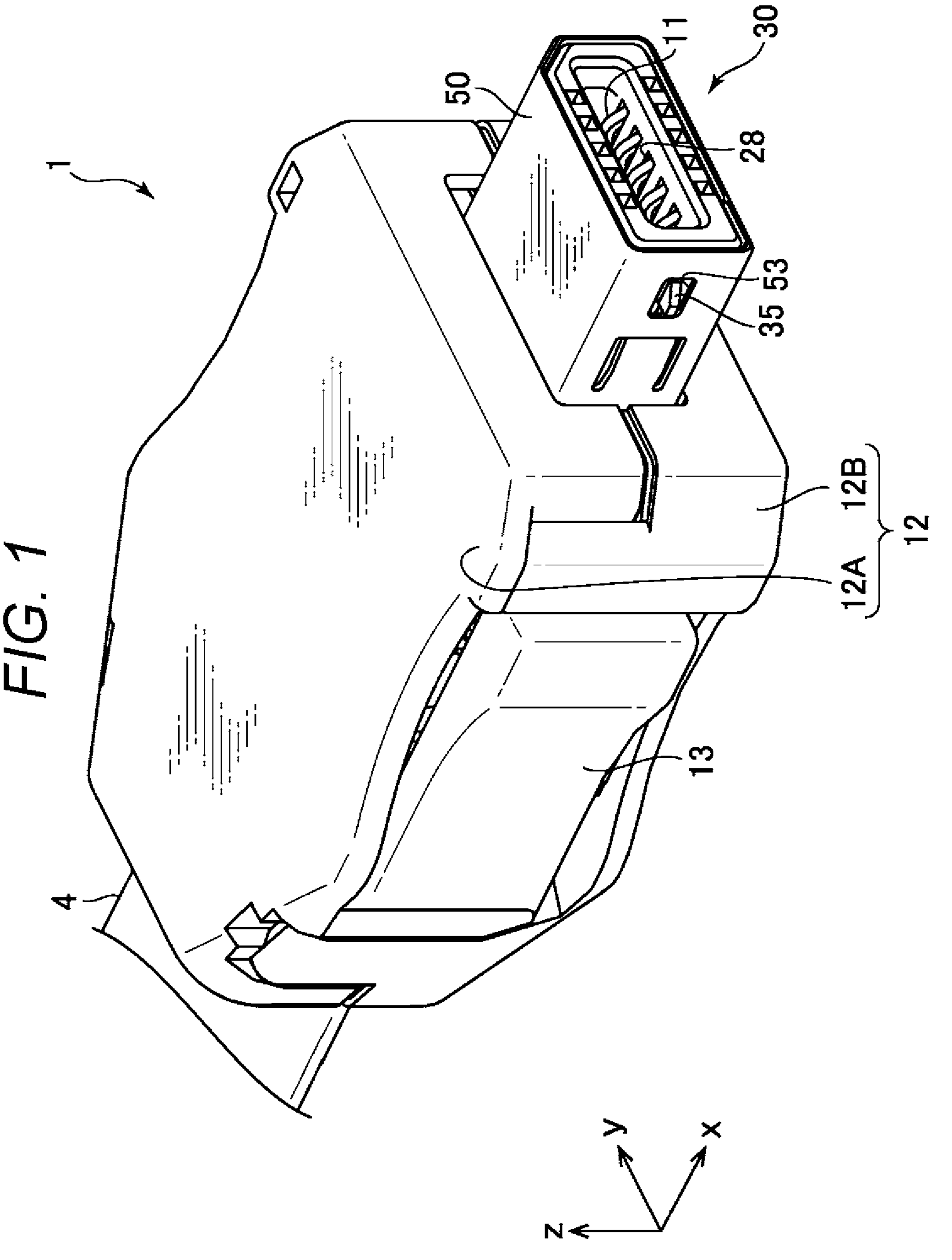
FIG. 1 is a perspective view of a cable connector device according to a preferred embodiment of the present disclosure, which uses a cable holding member according to the preferred embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the terminal unit of JP-A-11-224723, the shielded cable being a cable is placed with its end face exposed in the holding block as in a known cable holding member.

However, if the end face of the cable is exposed in this manner, a dielectric breakdown may be produced between the end face of the cable and the shielding member that covers the outer side of the holding block. In recent years, the specifications for dielectric withstanding voltage have become stricter, and such a dielectric breakdown problem is in need of solution.

The disclosure of the present application has been made to solve such a problem of the known technology, and provides a cable holding member that can effectively prevent a dielectric breakdown even if a cable is held with its end face exposed, and a cable connector device including such a cable holding member.

A cable holding member according to an aspect of the present disclosure includes: an insulated main body; a through-hole; a bend portion; and an insulated cover portion. In the cable holding member, the through-hole is configured to allow a cable to be inserted therethrough from one end side toward the other end side of the main body, the cover portion is configured to be bendable along the bend portion relative to the main body, at least a part of the cover portion is configured to, upon the cover portion being bent relative to the main body, be capable of covering a plane intersecting with a direction where the cable is inserted, at an opening end face of an opening portion of the through-hole, the opening end face being located on the other end side, or a vicinity thereof, the main body includes a latch portion, the cover portion includes a cantilever elastic piece having a latched portion, and it is configured in such a manner that upon the cover portion being bent relative to the main body, the elastic piece is elastically displaced at least in a direction along the direction where the cable is inserted, and the latched portion is capable of being latched to the latch portion. A cable connector device according to an aspect of the present disclosure includes such a cable holding member.

According to the cable holding member and cable connector device of the present disclosure, the cover portion can cover the plane intersecting with the cable insertion direction, at the opening end face of the opening portion of the through-hole where the cable is inserted, the opening end face being located at one end of the cable, or the vicinity thereof. Hence, it is possible to effectively prevent a dielectric breakdown that may be produced between an end face of the cable and a shielding member to be subsequently mounted even if the end face of the cable is exposed at the one end of the cable, and to hold the cover portion more reliably on the main body by use of the cantilever latched portion that can be elastically deformed. As is clear from the above description and the detailed description below, the "vicinity" of the "opening end face" of the opening portion of the through-hole in the specification means being sufficiently close to effectively prevent a dielectric breakdown that may be produced between the one end of the cable and the shielding member.

According to the present disclosure, it is possible to provide the cable holding member that can effectively prevent a dielectric breakdown that is produced between the end face of the cable and the shielding member to be subsequently mounted and to hold the cover portion more reliably on the main body even if the cable is held with its end face exposed, and the cable connector device including such a cable holding member.

An illustrative embodiment for carrying out the present disclosure is described in detail hereinafter with reference to the drawings. However, for example, dimensions, materials, shapes, and relative positions of constituent elements, which are described in the following embodiment, are arbitrary, and can be changed according to the configuration of a device to which the present disclosure is applied, or various conditions. For example, the present configuration can be suitably applied to, for example, a cable connector disclosed in WO 2018/016389 A. Moreover, a part of the configuration disclosed in WO 2018/016389 A can also be applied to the present configuration. Moreover, unless otherwise described, the scope of the present disclosure is not limited to the embodiment described specifically below.

FIG. 1 is a perspective view of a cable connector device 1 according to a preferred embodiment of the present disclosure, which uses a cable holding member according to the preferred embodiment of the present disclosure.

In the embodiment, the cable connector device 1 is formed as a plug connector. A counterpart connector device (not illustrated) that mates with the cable connector device 1 is formed as a receptacle connector. The counterpart connector may be, for example, a board connector connected to a board, or a cable connector as in the cable connector device 1.

The cable connector device 1 can mate and unmate the counterpart connector device along a direction of an arrow "x" illustrated in FIG. 1. The mating of the cable connector device 1 and the counterpart connector device can be locked by use of metal shells provided respectively. When the cable connector device 1 mates with the counterpart connector device, a tapered tubular shell 50 provided to a shielding-purpose shell 30 of the cable connector device 1 is inserted into a mating hole provided in a shell of the counterpart connector device. At this point in time, a lock projection portion 35 that projects elastically from a hole 53 provided in the tubular shell 50 fits in a through-hole being a locked portion provided in the shell of the counterpart connector. As a result, the mating of the cable connector device 1 and the counterpart connector device is locked. The locked state can be released by, for example, pressing a button 13 exposed from a resin case 12 into the cable connector device 1 in a direction of an arrow "y" illustrated in FIG. 1.

Figure 8:
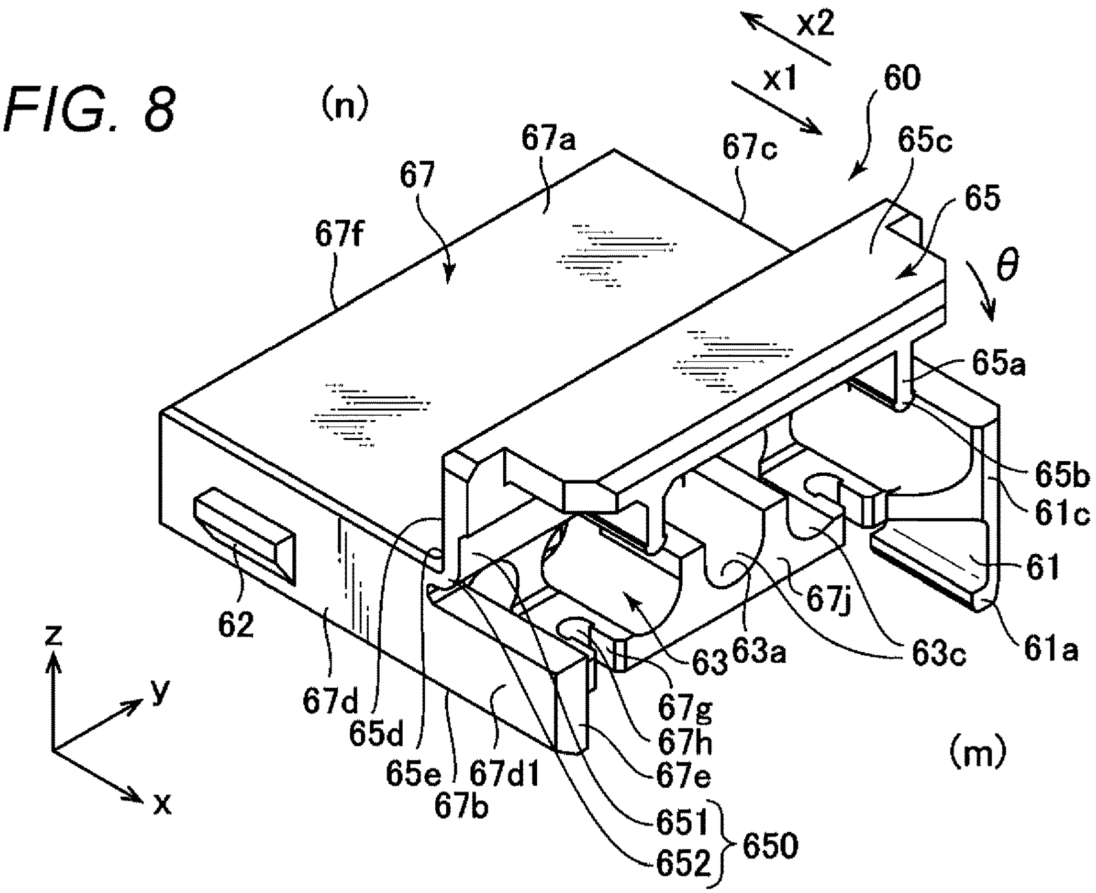
FIG. 8 is a perspective view of the front of the cable holding member as viewed from above.

The arrow "x" illustrated in, for example, FIG. 1 indicates the front-and-rear direction of the cable connector device 1. The arrow "y" indicates the width direction (the left-and-right direction). An arrow "z" indicates the thickness direction (the height direction). In the flowing description, for example, the directions of the arrows "x", "y", and "z" illustrated in, for example, FIG. 1 may be referred to as follows: The direction of the arrow "x" illustrated in, for example, FIG. 1 is referred to as the front-and-rear direction "x". Moreover, a side on which the cable connector device 1 is connected to the counterpart connector in the front-and-rear direction "x" is referred to as the "front side" or "forward", and the opposite side as the "rear side" or "rearward". A direction of an arrow "x1" illustrated in, for example, FIG. 8 is referred to as the "x1" direction where a cable 5 is inserted, or simply the insertion direction "x1". The direction of the arrow "y" illustrated in, for example, FIG. 1 is referred to as the width direction "y", or the left-and-right direction "y". The direction of the arrow "z" illustrated in, for example, FIG. 1 is referred to as the thickness direction "z", or the up-and-down direction "z". Moreover, a side where, in the cable connector device 1, a case 12A and a cable holding member 60A are in, for example, FIGS. 1 and 4 may be referred to as the "upper side", and a side where a case 12B and a cable holding member 60B are may be referred to as the "lower side" or the "bottom side".

Figure 2:
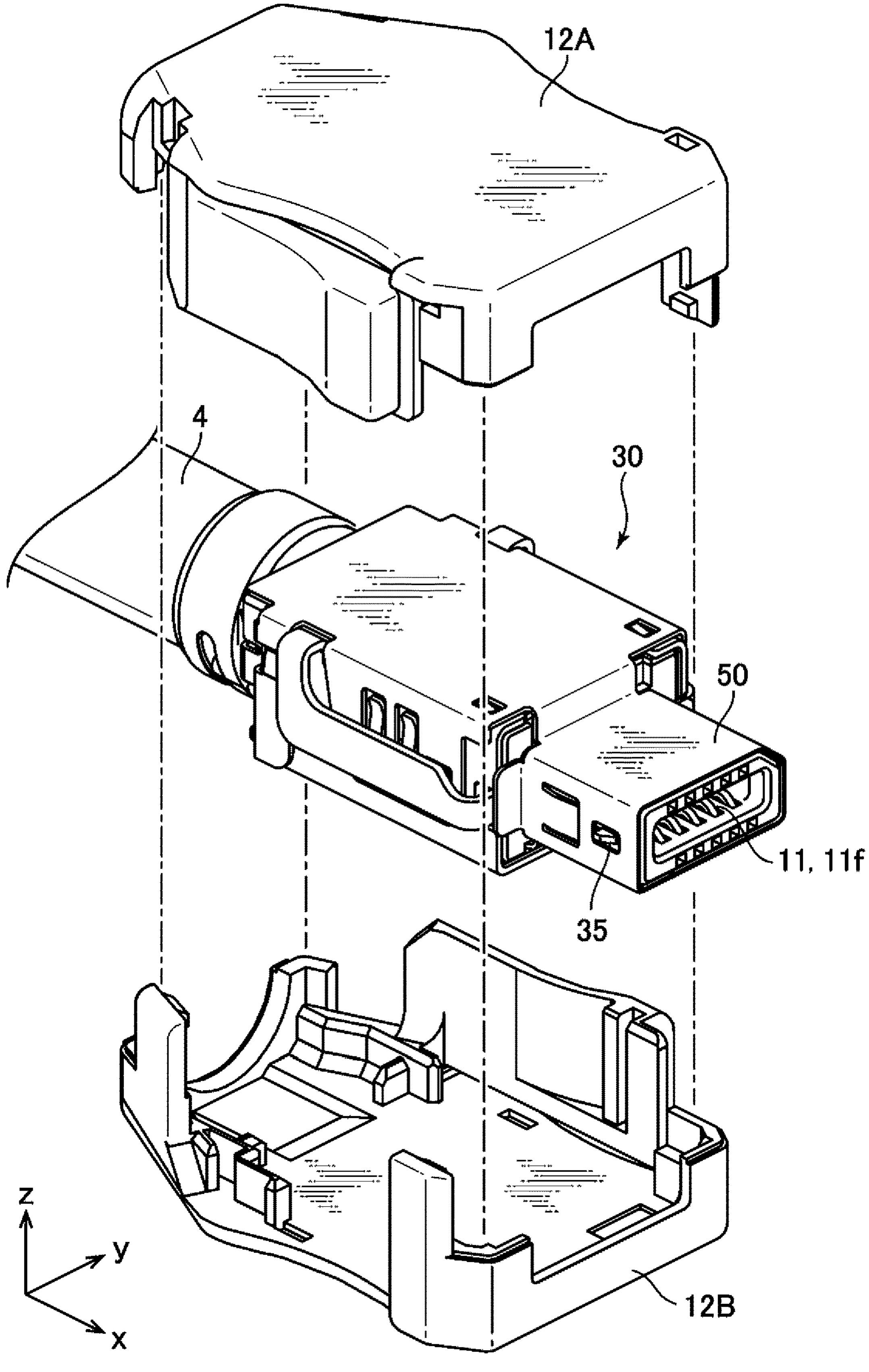
FIG. 2 is an exploded perspective view illustrating a state of the cable connector device of FIG. 1 from which a case has been removed.
Figure 3:
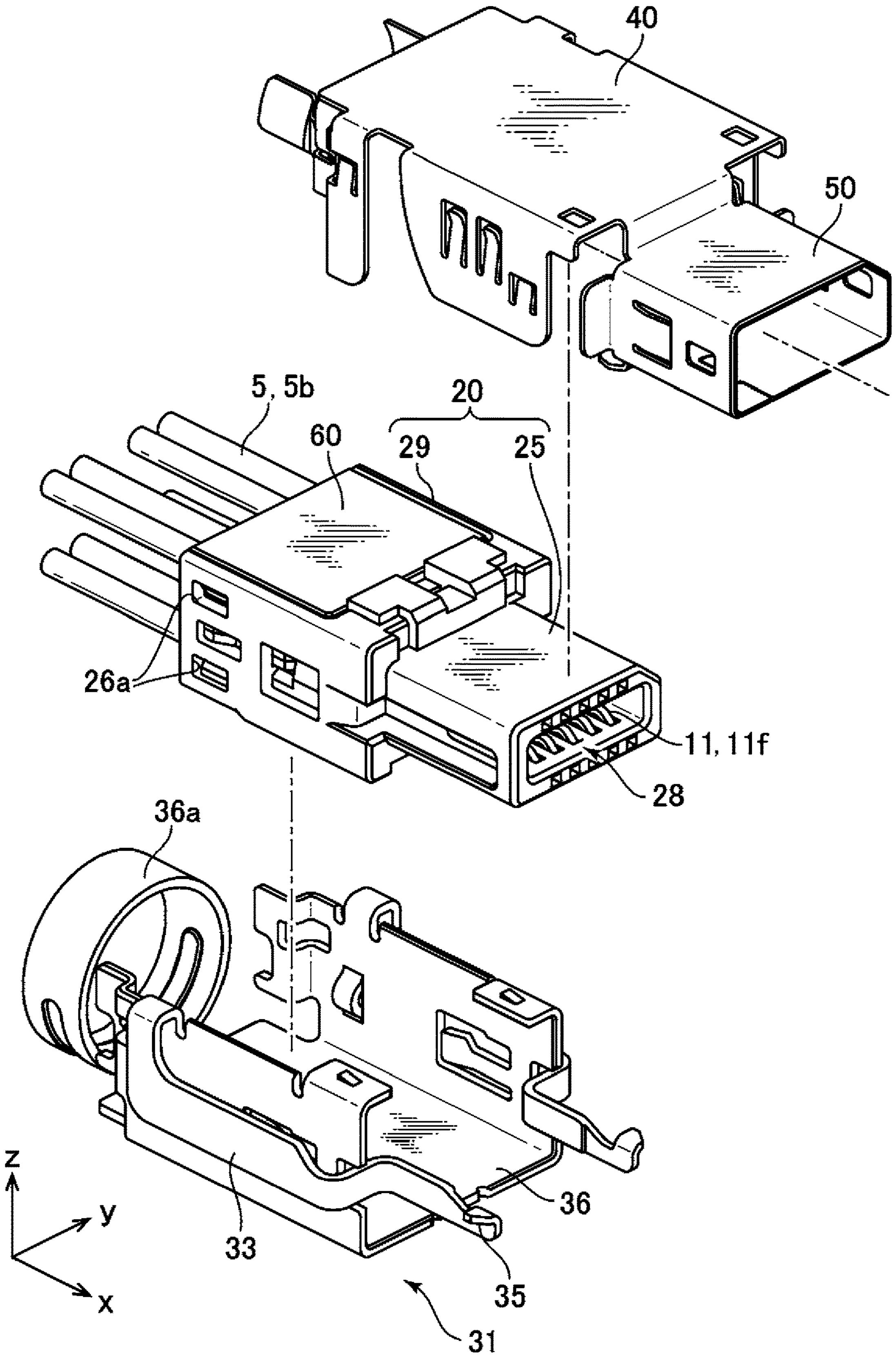
FIG. 3 is an exploded perspective view illustrating a state where a shell has been removed from the state of FIG. 2.
Figure 4:
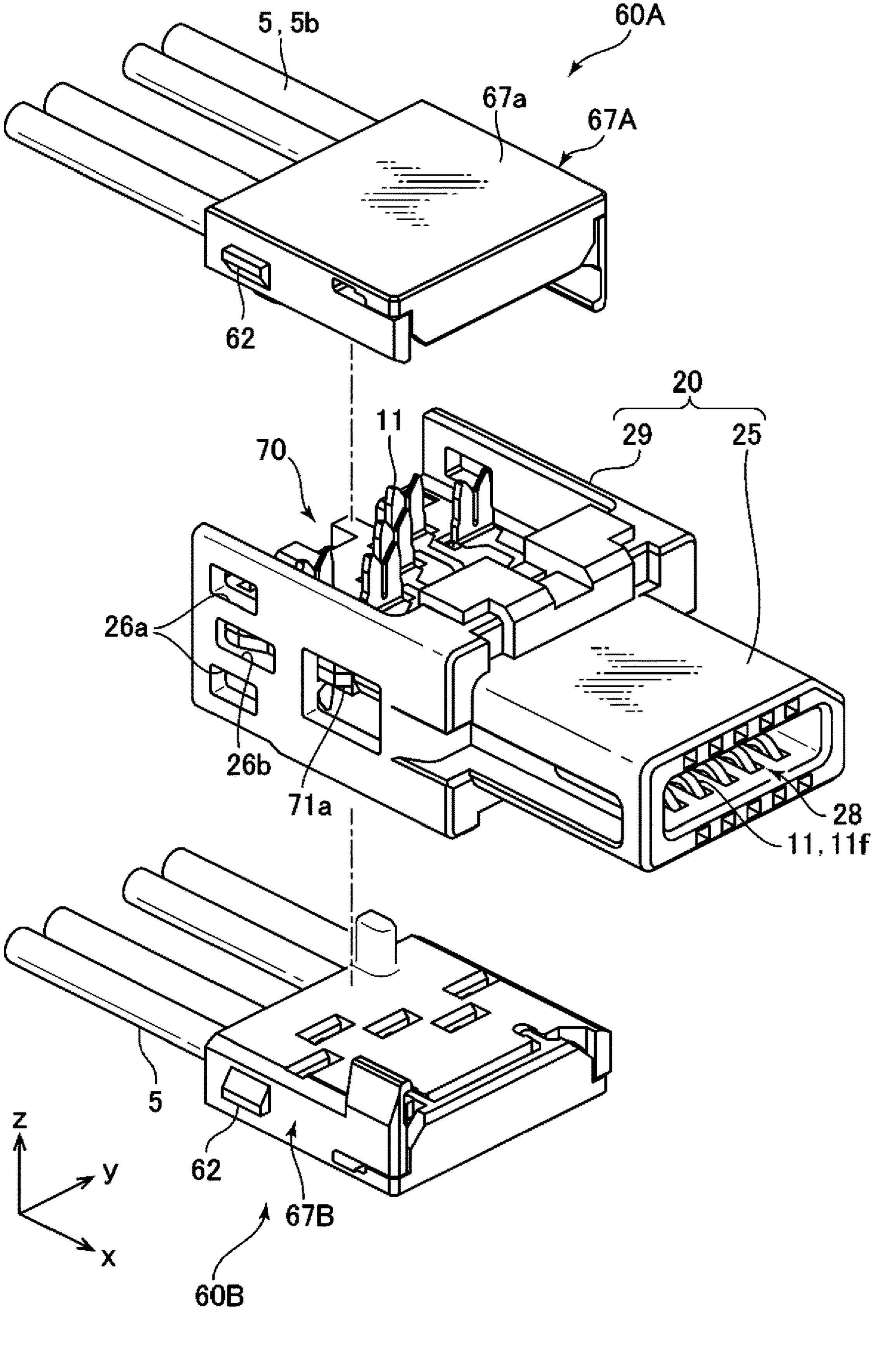
FIG. 4 is an exploded perspective view illustrating a state where the cable holding member has been removed from the state of FIG. 3.

FIGS. 2 to 4 illustrate exploded perspective views of the cable connector device 1. FIG. 2 illustrates a state of the cable connector device 1 of FIG. 1 from which the case 12 has been removed. The case 12 includes the case 12A and the case 12B (the letter "A" or "B" is added below only if it is necessary to differentiate between the cases 12A and 12B). FIG. 3 illustrates a state where the shell 30 has been further removed from the state of FIG. 2. FIG. 4 illustrates a state where a cable holding member 60 has been further removed from the state of FIG. 3. The cable holding member 60 includes the cable holding member 60A and the cable holding member 60B (if there is no need to differentiate between the cable holding members 60A and 60B in the following description, they may be simply referred to as the cable holding member 60).

The cable connector device 1 mainly includes the insulated cases 12A and 12B that form an outermost shell of the cable connector device 1, the metal shell 30 whose outer surface is covered by the cases 12A and 12B, an insulated housing 20 whose outer surface is covered by the shell 30, the insulated cable holding member 60 that holds twisted-pair cables 5 included in an electric cable 4, and an insulated terminal support 70 that supports terminals 11 mounted on the housing 20. In the embodiment, the twisted-pair cable 5 is illustrated as an example of the electric cable 4. However, naturally, the electric cable 4 is not limited to the twisted-pair cable 5. Naturally, the cable connector device 1 can also be applied to various cables other than the twisted-pair cable 5. Note that in the following description, the twisted-pair cable 5 may be referred to as the cable 5.

As is clearly illustrated in FIG. 3, the shell 30 includes a main shell 31, and a plate-shaped shell 40 and the tubular shell 50 which are coupled to each other. The main shell 31 is formed by blanking and bending a metal plate. Similarly, the plate-shaped shell 40 and the tubular shell 50 are also formed by blanking and bending another metal plate. The plate-shaped shell 40 and the main shell 31 are assembled together and mainly cover outer surfaces on the sides of a housing main body 29. On the other hand, the tubular shell 50 as a whole has an approximately rectangular tubular shape in cross section and mainly covers outer surfaces on the sides of an inserted portion 25 that projects from the housing main body 29. The main shell 31 includes a base portion 36, a crimping portion **36*a* for crimping the electric cable 4, which extends rearward of the base portion 36, and an elastic piece 33 that extends forward of the base portion 36 and has a free end on the side of mating with the counterpart connector device. The elastic piece 33 is provided, at the distal end, with a lock projection portion 35 that works with the counterpart connector device as a lock. For the sake of convenience, the crimping portion 36*a* illustrated in FIG. 3 is in a state where the electric cable 4 has been crimped. Before the electric cable 4 is crimped, the crimping portion 36*a* is in a state where a part of the crimping portion 36*a* is open to enable easy installation of the electric cable 4**.

Figure 5:
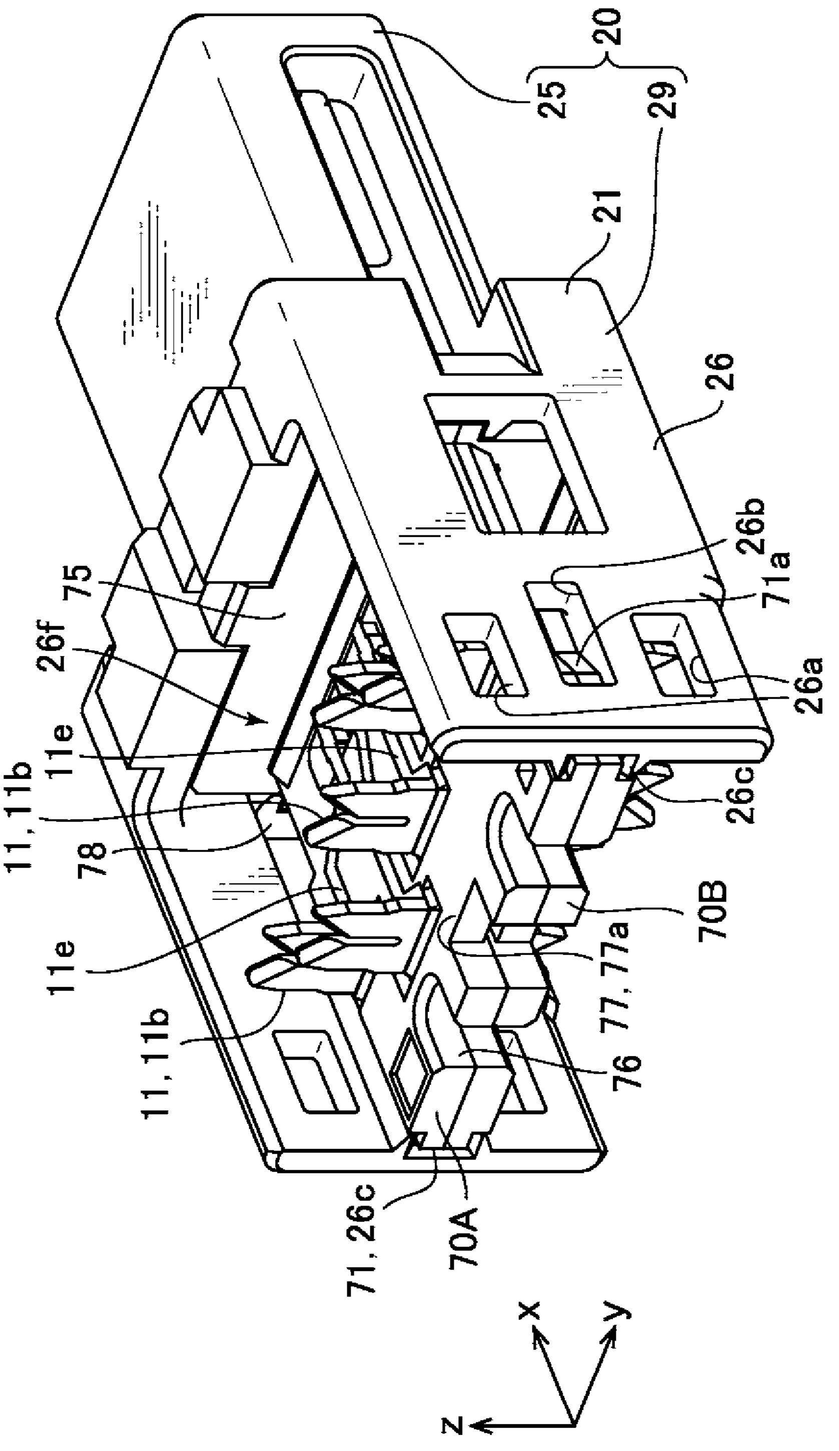
FIG. 5 is a perspective view of a state where a terminal support has been mounted on a housing, as viewed from the rear.
Figure 6:
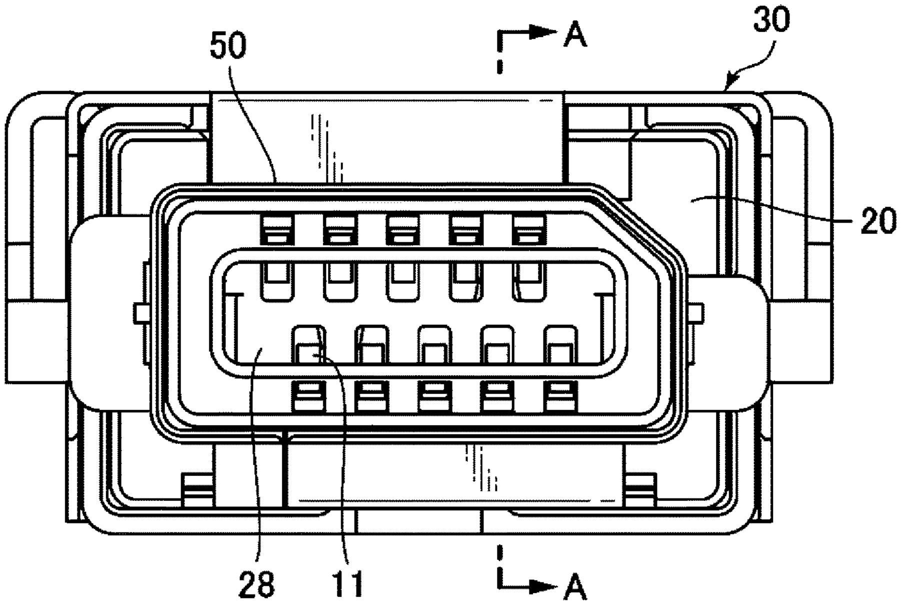
FIG. 6 is a front view illustrating a state of the cable connector device from which the case has been removed.
Figure 7:
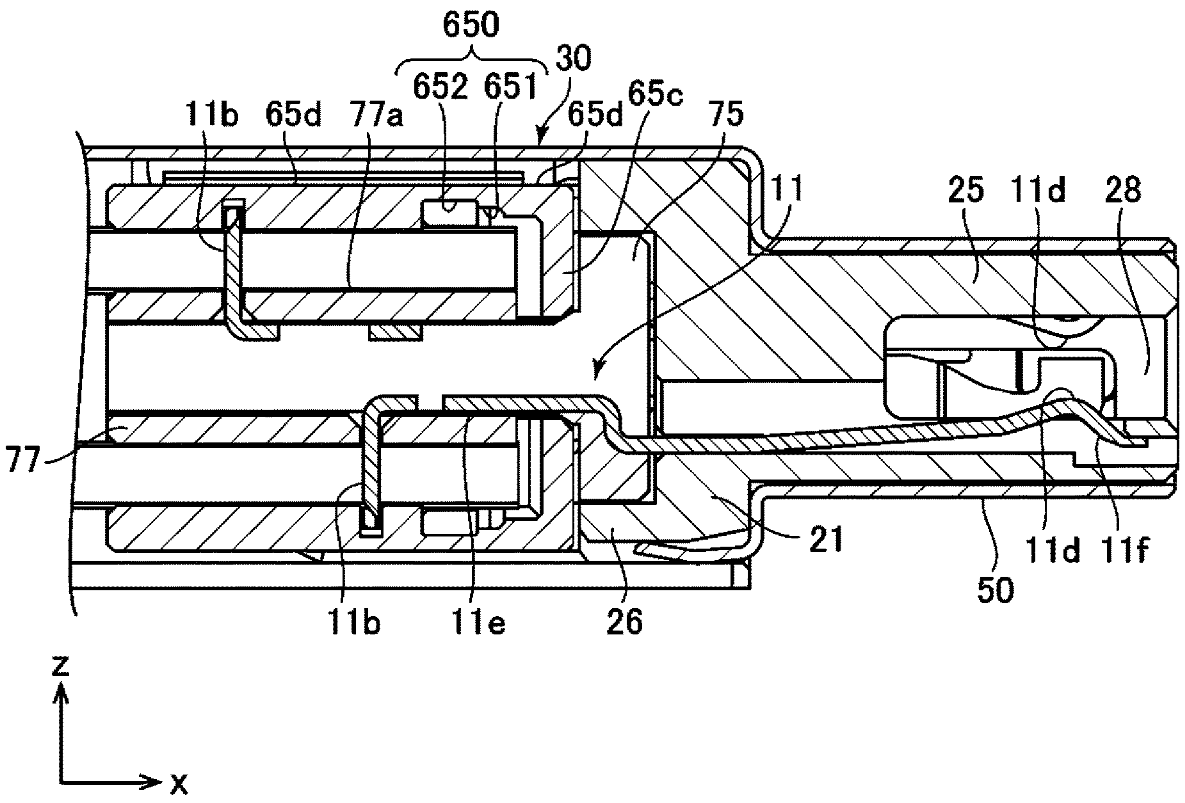
FIG. 7 is a cross-sectional view taken along line A-A in FIG. 6.

FIG. 5 illustrates a perspective view of a state where the terminal support 70 has been mounted on the housing 20, as viewed from the rear. FIG. 6 illustrates a front view of a state where the cable holding members 60A and 60B and the shell 30 have been further mounted on the housing 20 in the state illustrated in FIG. 5, in other words, a state of the cable connector device 1 illustrated in FIG. 2 from which the cases 12A and 12B have been removed. FIG. 7 illustrates a cross-sectional view taken along line A-A in FIG. 6.

The housing 20 is manufactured by integral molding with resin, and includes the housing main body 29, and the inserted portion 25 that projects from the housing main body 29 toward the side of mating with the counterpart connector device. The housing main body 29 forms an approximately cuboid shape by being complemented by the terminal support 70 and the cable holding member 60. The inserted portion 25 is a portion that is, together with the tubular shell 50, inserted into the mating hole of the counterpart connector device. A mating recessed portion 28 where a mating protruding portion (not illustrated) provided in the mating hole of the counterpart connector device is inserted is formed in the inserted portion 25.

The housing main body 29 includes a thick base portion 21, and two opposing plate-shaped side walls 26 that extend rearward of the base portion 21, that is, toward a side opposite to the inserted portion 25. A space **26*f* is formed between the two plate-shaped side walls 26. The terminal support 70 and the cable holding member 60 are installed in the space 26*f*. The terminal support 70 includes a pair of terminal supports 70A and 70B, and the cable holding member 60 includes the pair of cable holding members 60A and 60B (the letter "A" or "B" is added below only if it is necessary to differentiate between the cable holding members 60A and 60B, and the same applies to the constituent portions of the terminal supports 70A and 70B). In the embodiment, the terminal supports 70A and 70B have the same size and shape. Similarly, the cable holding members 60A and 60**B also have the same size and shape. The sizes and the shapes are made the same in this manner, which facilitates parts management and enables simplification of the manufacturing process.

The terminal support 70 supports the plurality of terminals 11 in a cantilever form. The terminals 11 are integrated in the terminal support 70 by integral molding upon manufacturing. Alternatively, the terminals 11 may be integrated in the terminal support 70 by, for example, press-fitting after the terminal support 70 is manufactured. After being integrated in the terminal support 70, the terminal 11 is still partially exposed to the outside. For example, the front part of the terminal 11, that is, a vicinity of a distal end 11*f* of the terminal 11, which extends toward the base portion 21 of the housing 20, the rear part of the terminal 11, that is, a cable cold-welding portion 11*b* that cold-welds to the twisted-pair cable 5, and a wiring portion 11*e* around the cable cold-welding portion 11*b* remain exposed to the outside (refer to FIG. 7).

The terminal support 70 includes a plate-shaped main body 77. An upper surface 77*a* of the main body 77 is provided with a rising portion 75. Each of the left and right side surfaces of the main body 77 is provided with a lock projection portion 71*a* that projects outward. The rear edge of the main body 77 is provided with two notches 76 made inward that are each a U-shape cut in plan view (refer to FIG. 5).

When the terminal support 70 is mounted on the housing 20, flat bottom surfaces of the pair of terminal supports 70A and 70B are brought into contact with each other first. When the pair of terminal supports 70A and 70B is brought into contact with each other, a gap where a contacted object, for example, the mating protruding portion provided in the mating hole of the counterpart connector device is inserted can be formed between a contact 11*d* of the terminal 11 supported by the terminal support 70A and a contact 11*d* of the terminal 11 supported by the terminal support 70B. The distal end 11*f* of the terminal 11 that forms the contact 11*d* is configured in such a manner as to be elastically displaceable in the "z" direction to be brought into elastic contact with the contacted object (refer to FIG. 7). The pair of terminal supports 70A and 70B that are in contact with each other is then mounted as it is on the housing 20 along a direction parallel to the contact surfaces. Specifically, left and right side surfaces 71 of the terminal support 70 are slid on the housing 20 along guide grooves 26*c* provided in inner walls of the plate-shaped side walls 26 to guide the terminal support 70 to a predetermined position of the housing 20. As a result, the lock projection portions 71*a* provided on the side surfaces 71 of the terminal support 70 fit in lock holes 26*b* provided in the plate-shaped side walls 26 of the housing 20 to lock the terminal support 70 to the housing 20 (refer to FIG. 5).

The cable cold-welding portion 11*b* extends in the same direction as the rising portion 75, that is, the "z" direction on the upper surface 77*a* of the main body 77 of the terminal support 70. The plurality of terminals 11 each include the cable cold-welding portion 11*b*. The plurality of cable cold-welding portions 11*b* is placed in lines in the "y" direction. In the embodiment, five cable cold-welding portions 11*b* arranged in the "y" direction are staggered in the "x" direction (refer to FIGS. 4 and 5). A distal end portion of the cable cold-welding portion 11*b* has a slit between bifurcations thereof. Each of the cables 5 held by the cable holding member 60 is press-fitted in the slit of the distal end portion of the cable cold-welding portion 11*b*. An outer sheath 5*b* of the cable 5 is cut in the slit of the distal end portion of the cable cold-welding portion 11*b* upon press-fitting. As a result, an inner conductor 5*a* (refer to, for example, FIG. 12) such as a core wire is caught in the slit of the distal end portion of the cable cold-welding portion 11*b*, and the cable 5 and the terminal 11 are brought into conduction. Consequently, the plurality of cable cold-welding portions 11*b* is physically and electrically coupled to the plurality of wiring portions 11*e*, respectively.

Figure 9:
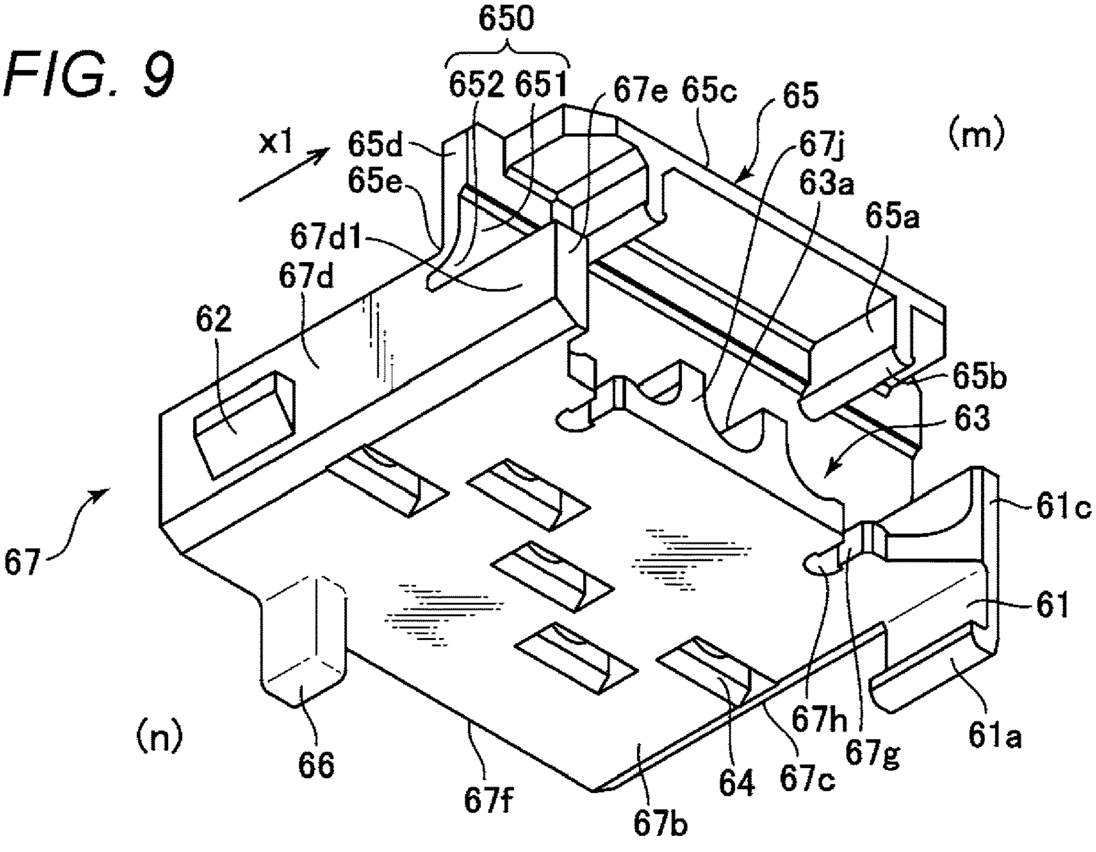
FIG. 9 is a perspective view of the front of the cable holding member as viewed from below.
Figure 10:
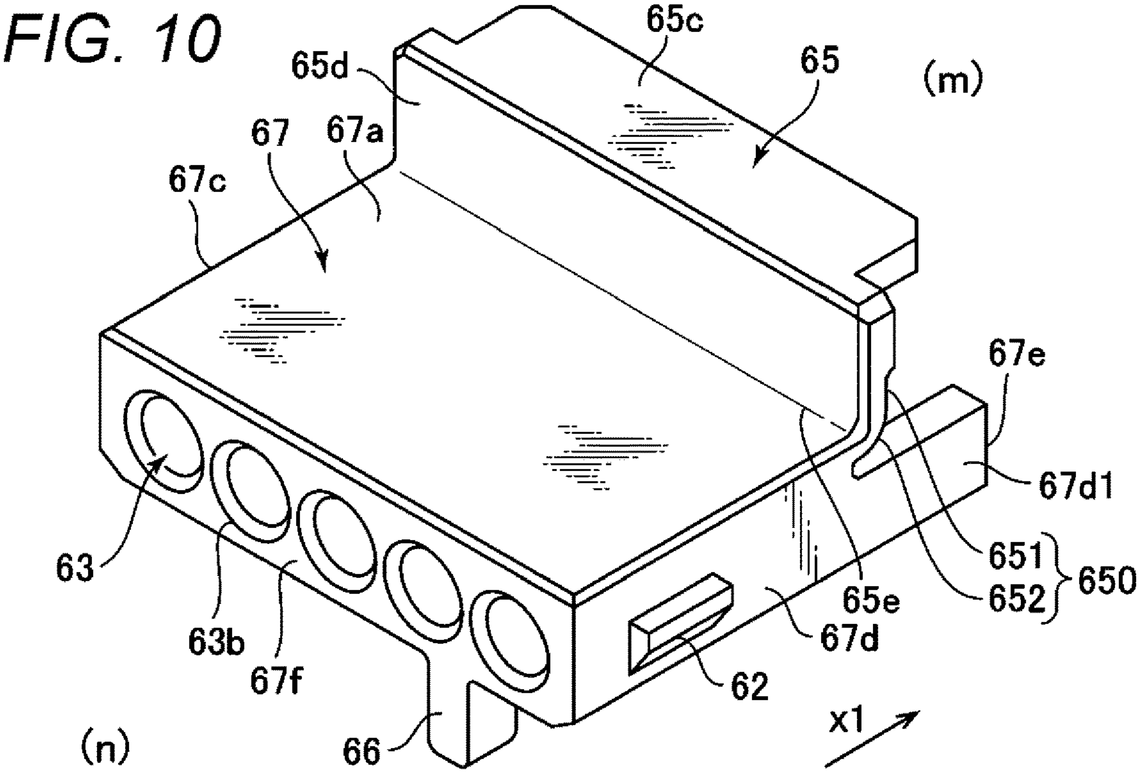
FIG. 10 is a perspective view of the rear of the cable holding member as viewed from above.
Figure 11:
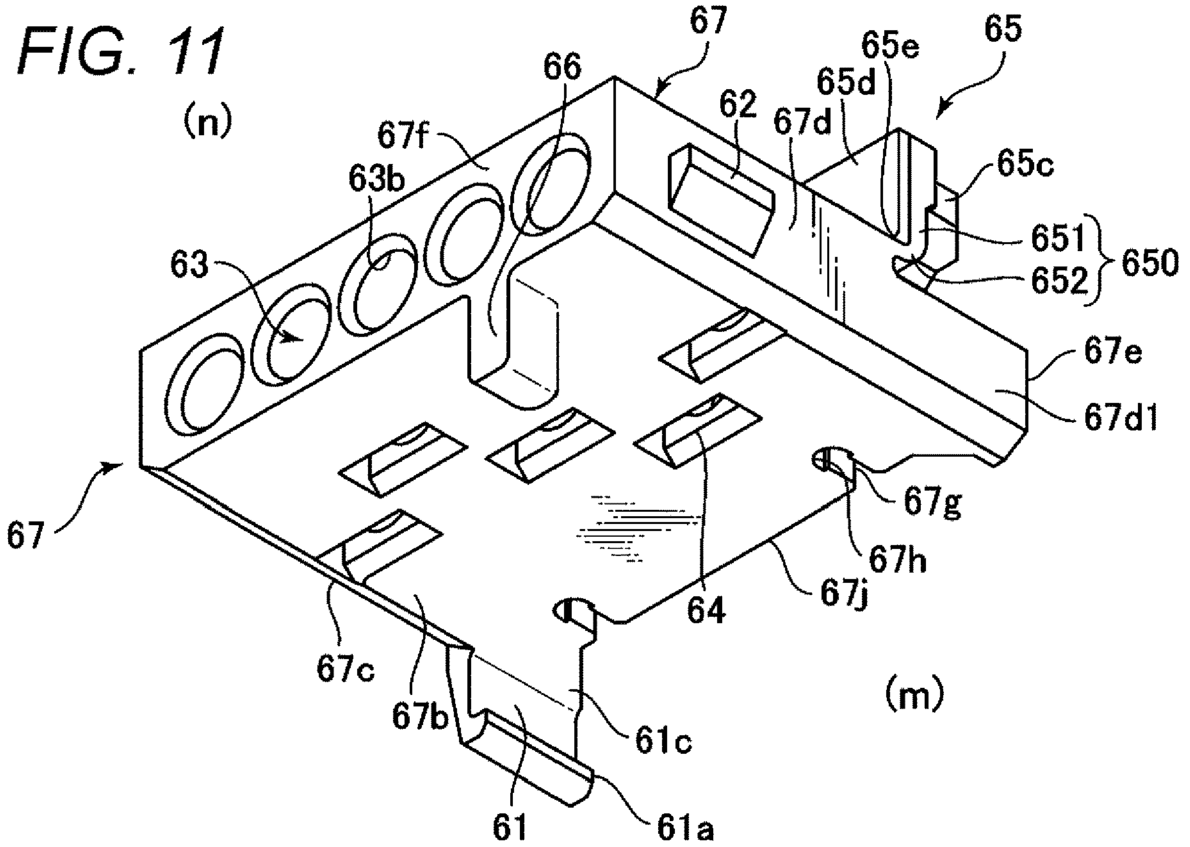
FIG. 11 is a perspective view of the rear of the cable holding member as viewed from below.

FIGS. 8 to 11 illustrate the state of the cable holding member 60 before the cables 5 are mounted, in perspective view. FIG. 8 is a perspective view of the front of the cable holding member 60 in such a state as viewed from above. FIG. 9 is a perspective view of the front of the cable holding member 60 as viewed from below. FIG. 10 is a perspective view of the rear of the cable holding member 60 of FIG. 8 as viewed from above. FIG. 11 is a perspective view of the rear of the cable holding member 60 as viewed from below.

The cable holding member 60 mainly includes an approximately cuboid main body 67, and a cantilever arm portion 61. The cable holding member 60 is integrally molded with resin.

A plurality of through-holes 63 is provided along the front-and-rear direction, that is, the "x" direction in the main body 67 of the cable holding member 60 to enable holding the cables 5. Each through-hole 63 is provided with an opening portion 63*b* on the front side, that is, on one end side (n) being a side that is connected to the counterpart connector device, and is provided with an opening portion 63*a* on the rear side, that is, on the other end side (m) being a side opposite to the one end side (n) in the font-and-rear direction "x". The cable 5 can be inserted through the opening portions 63*a* and 63*b* along the insertion direction "x1". As is clearly illustrated in FIGS. 8 and 9, the through-holes 63 have a semicircular or quadrantal cross section near the opening portions 63*a* on the other end side (m). In other words, on the other end side (m), each of the through-holes 63 includes only the bottom side, that is, a cable mounting portion 63*c* where the cable 5 is placed, and opens to the upper side. The open portion (which hereafter may be referred to as the open portion, or the upper open portion) of the cable mounting portion 63*c* can be covered by a part (a second portion 65*d*) of a cover portion 65 described below. In other words, the upper part of the through-hole 63 can be completely closed. The inside diameter of the through-hole 63 is set substantially the same, or slightly less than, the outside diameter of the cable 5. Consequently, an outer surface of the cable 5 is caught on an inner surface of the through-hole 63, which enables preventing the cable 5 from coming out of the through-hole 63. In the embodiment, the plurality of through-holes 63 is provided. However, the number of the through-holes 63 is not necessarily more than one, but may be only one.

The cover portion 65 is a plate-shaped member being a part of the main body 67 of the cable holding member 60, and is provided in such a manner as to be bendable along a bend portion 65*e* relative to the main body 67. As illustrated in the embodiment, the thickness of the bend portion 65*e* may be set less than the thickness around the bend portion 65*e* by use of, for example, a step portion 650 to enable and/or facilitate bending. The step portion 650 includes a first step portion 651 that is located on the other end side (m) and is relatively thick, and a second step portion 652 that is located on the one end side (n) and is relatively thin.

The cover portion 65 as a whole has an approximate L shape in side view in any cross section in a direction orthogonal to a direction along the bend portion 65*e*, that is, the width direction "y", in other words, in any "x-z plane." In the width direction "y", the width of, for example, a plate-shaped first portion 65*c* that forms a part of the approximate L shape, is set less than the width of, for example, a plate-shaped second portion 65*d* that forms another part of the approximate L shape. The first portion 65*c* is coupled along the width direction "y" to a part of one end of the second portion 65*d*. The other end of the second portion 65*d* is coupled to an upper surface 67*a* of the main body 67 in such a manner as to be bendable along the bend portion 65*e* relative to the main body 67. In a state where the cover portion 65 is not bent relative to the main body 67 of the cable holding member 60, the second portion 65*d* of the cover portion 65 rises at the bend portion 65*e* at an angle of approximately 90 degrees relative to the upper surface 67*a* of the main body 67 (refer to, for example, FIGS. 8 and 10).

Next, a description is given of when the second portion 65*d* of the cover portion 65 is bent at the bend portion 65*e* or a vicinity thereof in a direction of approaching the main body 67 (a "θ" direction). When the cover portion 65 is bent as described above, the first portion 65*c* covers the opening portion 63*a*, or a vicinity thereof. Specifically, the first portion 65*c* covers a plane (a "y-z" plane) that intersects with the cable insertion direction "x1", at the opening portion 63*a* or the vicinity thereof. The second portion 65*d* covers the cable mounting portion 63*c*. Specifically, the second portion 65*d* covers a plane, the "x-y plane," formed by the cable insertion direction "x1" and the "y" direction along the bend portion 65*e* ( ), at the upper open portion of the cable mounting portion 63*c* of the through-hole 63, which is located closer to the one end side (n) than an opening end face 67*j* in a direction along the cable insertion direction "x1".

Both of the first portion 65*c* and the second portion 65*d* are closed, and neither are provided with, for example, holes. Hence, the opening end face 67*j* of the opening portion 63*a* of the through-hole 63 is covered substantially completely by the first portion 65*c* in the "y-z plane.". Moreover, the upper part of the through-hole 63 (the upper open portion of the cable mounting portion 63*c*) is covered substantially completely by the second portion 65*d* in the "x-y plane."

It is preferable that latching means be provided between the main body 67 and the cover portion 65 to maintain the bent state of the cover portion 65. In the embodiment, recessed portions 67*g* as recessed latch portions, and protruding portions 65*a* as protruding latched portions that are latched in the latch portions are provided, as the latching means, to the main body 67 and the cover portion 65, respectively. The protruding portions 65*a* project in a direction corresponding to the "θ" direction where the cover portion 65 is bent relative to the main body 67. On the other hand, the recessed portions 67*g* are indented in the direction corresponding to the "θ" direction where the cover portion 65 is bent. In order to further ensure latching, two pairs of the protruding portions 65*a* and the recessed portions 67*g* are provided in the embodiment. The pairs of the protruding portions 65*a* and the recessed portions 67*g* are simply required to be provided at positions other than the positions where the through-holes 63 are provided, on the opening end face 67*j* on the other end side (m) of the main body 67. In the embodiment, each pair of the protruding portion 65*a* and the recessed portion 67*g* is placed outward of the plurality of through-holes 63 in the arrangement direction "y" of the plurality of through-holes 63. Moreover, in order to further ensure latching, a bulging portion 65*b* is provided near a distal end of the protruding portion 65*a*, and a bulging portion 67*h* for the bulging portion 65*b* is provided near the depths of the recessed portion 67*g*. Providing the bulging portions 65*b* and 67*h* allows the protruding portion 65*a* to be press-fitted in the recessed portion 67*g* upon latching of the protruding portion 65*a* and the recessed portion 67*g*. The latching means is simply required to be capable of maintaining the state where the cover portion 65 is bent relative to the main body 67. Therefore, contrary to the example of the embodiment, the recessed portion may be provided in the cover portion 65, and the protruding portion on the main body 67. Alternatively, a latching means other than the protruding portion and the recessed portion, for example, an adhesive may be used. Moreover, the protruding portion and the recessed portion are simply required to be placed at positions other than the positions where the through-holes 63 are provided. Hence, the protruding portion and the recessed portion are not necessarily placed outward of the through-holes 63 in the arrangement direction "y" of the through-holes 63, and may be placed in the center in the arrangement direction "y" of the through-holes 63, as illustrated in a modification (FIG. 16) described below.

A bottom surface 67*b* of the main body 67 of the cable holding member 60 is provided with insertion holes 64 where the cable cold-welding portions 11*b* (refer to FIG. 5) of the terminals 11 are inserted. The insertion hole 64 communicates with the through-hole 63 where the twisted-pair cable 5 is inserted to allow the cable cold-welding portion 11*b* inserted in through the insertion hole 64 to cut the sheath 5*b* of the cable 5 inserted through the through-hole 63 when the cable holding member 60 is mounted on the housing 20.

The bottom surface 67*b* of the main body 67 is provided with a projection portion 66 that fits in the notch 76 (refer to FIG. 5) provided in the terminal support 70 when the cable holding member 60 is mounted on the housing 20. The projection portion 66 is provided, rising on a surface on a side where the cable holding member 60 is mounted on the housing 20, that is, on the bottom surface 67*b* along the up-and-down direction "z", which is a direction along a direction where the cable holding member 60 is mounted on the housing 20.

A latch projection portion 62 is provided to each of side surfaces 67*c* and 67*d* of the main body 67 on the one end side (n) in the front-and-rear direction "x". The latch projection portions 62 are latched in latch holes 26*a* (refer to FIGS. 4 and 5) provided in the plate-shaped side walls 26 of the housing 20. When the cable holding member 60 is mounted on the housing 20, the latch projection portions 62 are engaged in the latch holes 26*a*. As a result, it is possible to latch the cable holding member 60 to the housing 20.

On the other hand, an extension portion that extends along the "x1" direction where the cable 5 is inserted toward the one end side (n) or the other end side (m) of the through-hole 63 relative to the opening end face 67*j* of the opening portion 63*a* is formed on each of the side surfaces 67*c* and 67*d* of the main body 67 on the other end side (m) in the front-and-rear direction "x". At least a part of the arm portion 61 forms the extension portion provided to the side surface 67*c* (hence, the extension portion provided to the side surface 67*c* is described with the same reference numeral 61 as the arm portion 61 in the following description). The side surface 67*d* is provided with an extension portion 67*d*1. The two extension portions 61 and 67*d*1 are placed, facing in the width direction "y", in such a manner as to sandwich the opening end face 67*j* of the opening portion 63*a*. An end face 61*c* of the extension portion 61 and an end face 67*e* of the extension portion 67*d*1 are provided in such a manner as to be located in a plane, the "y-z plane," that intersects with the "x1" direction where the cable 5 is inserted. Such end faces 61*c* and 67*e* are provided to facilitate cutting the cable 5 at a predetermined position as described below.

The arm portion 61 forming the extension portion of the side surface 67*c* extends downward of the bottom surface 67*b* along the up-and-down direction "z" being the direction where the cable holding member 60 is mounted on the housing 20, as in the projection portion 66. A latch projection portion 61*a* that can be latched in a part of the main body 77 of the terminal support 70 is provided near a free end of the arm portion 61. The arm portion 61 is a portion that is used to, for example, fix the cable holding member 60 to the housing 20 as in the latch projection portion 62. The arm portion 61 is latched in the part of the main body 77 of the terminal support 70 when inserted in a hole 78 (refer to FIG. 5) formed by the housing 20 and the terminal support 70. In order to facilitate latching, the arm portions 61 are provided in such a manner as to be elastically displaceable in the thickness direction.

The cable holding member 60 is mounted on the housing 20 after the terminal support 70 is mounted on the housing 20, that is, when the housing 20 is in the state of FIGS. 4 and 5. The cable holding member 60 is mounted by, for example, the fingers or a jig after being positioned on the housing 20. For example, the cable holding member 60 can be mounted on the housing 20 by temporarily applying a pinching force to the upper surfaces 67*a* of the pair of opposing cable holding members 60A and 60B (refer to FIG. 4) at the same time. At this point in time, the cable 5 can be cut by the cable cold-welding portion 11*b* with this force, and fixed at the predetermined position of the housing 20 and the cable holding member 60.

Figure 12:
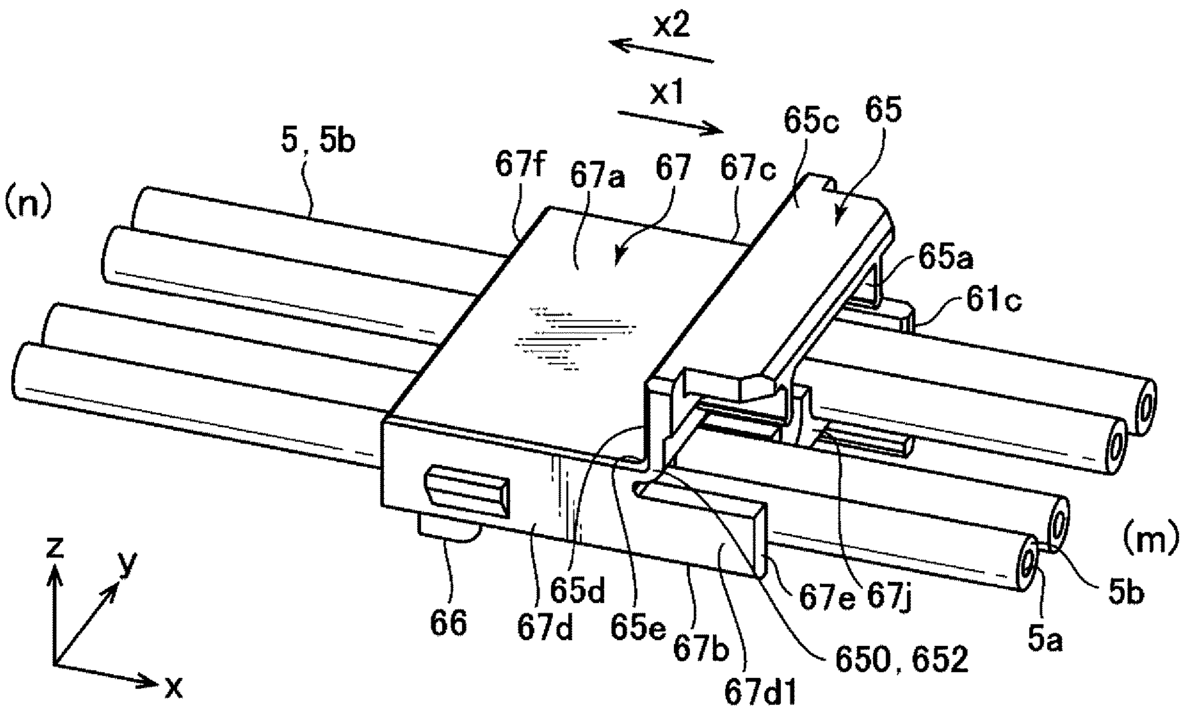
FIG. 12 is a diagram illustrating a method for mounting a cable on the cable holding member in stages.

A method for mounting the cable 5 on the cable holding member 60 is described with reference to FIGS. 12 to 15. Firstly, the cable 5 is inserted through the through-hole 63 provided in the main body 67 of the cable holding member 60 as illustrated in FIG. 12. The cable 5 is inserted into the through-hole 63 through the opening portion 63*b* located on the one end side (n), and is taken out of the opening portion 63*a* located on the other end side (m). At this point in time, the cable 5 is pulled out of the through-hole 63 until the distal end of the cable 5 reaches a position that is sufficiently away in the insertion direction "x1" from the end faces 61*c* and 67*e* of the extension portions 61 and 67*d*1 of the side surfaces 67*c* and 67*d* of the main body 67.

Figure 13:
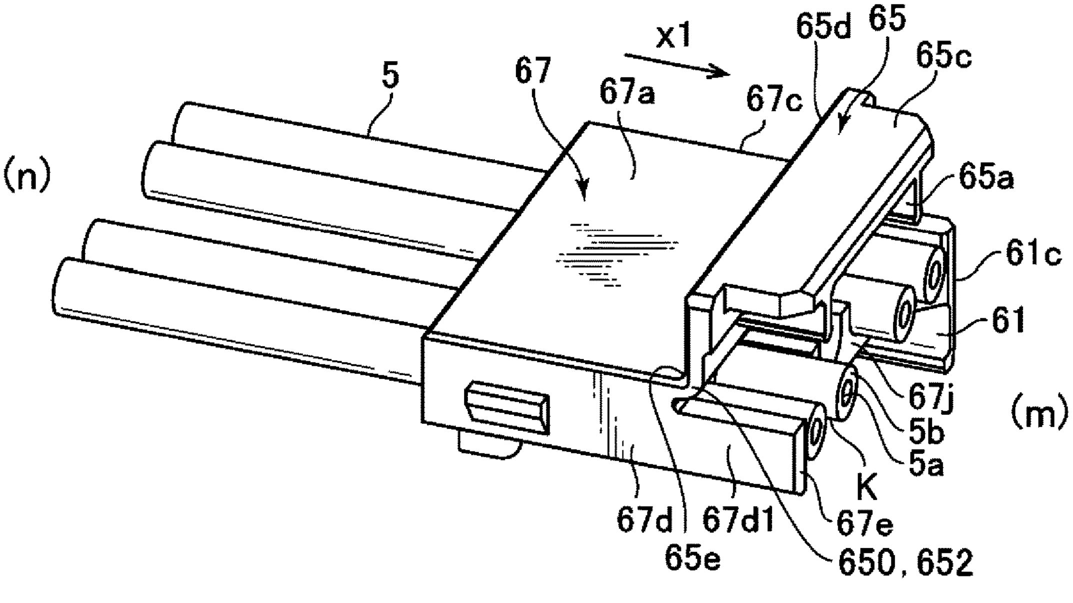
FIG. 13 is a diagram illustrating the method for mounting the cable on the cable holding member in stages.

Next, as illustrated in FIG. 13, the cable 5 is cut by use of the end faces 61*c* and 67*e* of the extension portions 61 and 67*d*1 of the side surfaces 67*c* and 67*d*. Specifically, a side surface of a blade of, for example, a box cutter is moved along the end faces 61*c* and 67*e* and in contact with both of the end faces 61*c* and 67*e* to cut the cable 5. A section "K" of the inner conductor 5*a* is formed. The cable 5 is cut by such a method to locate the section "K" of the inner conductor 5*a* of the cable 5 that is exposed to the outside on the other end side (m) at substantially the same position as the end faces 61*c* and 67*e* of the extension portions 61 and 67*d*1 in the front-and-rear direction "x".

Figure 14:
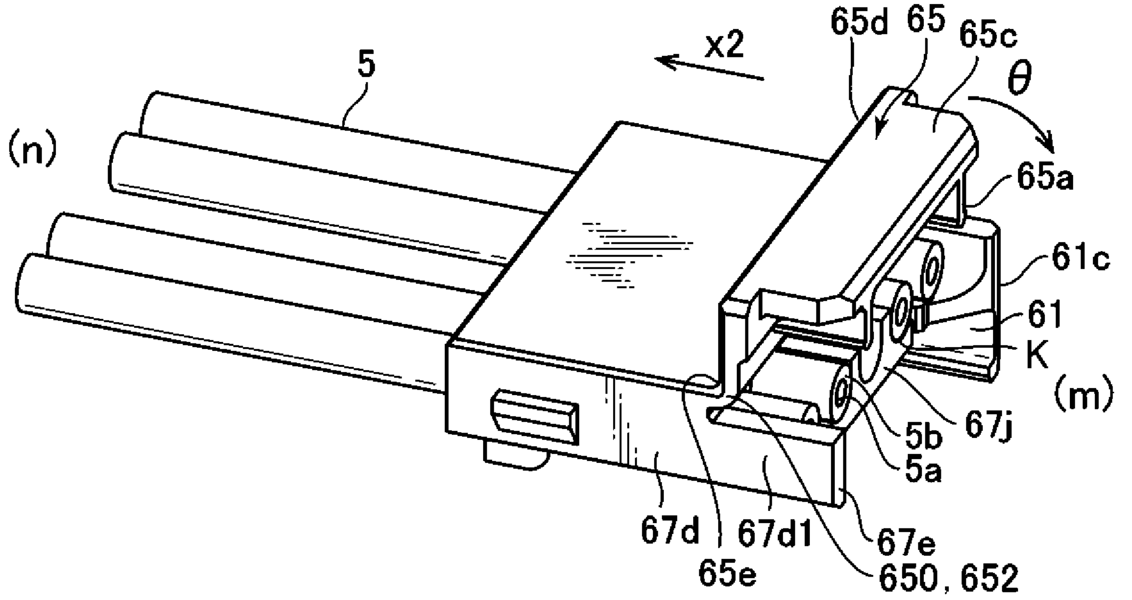
FIG. 14 is a diagram illustrating the method for mounting the cable on the cable holding member in stages.

Next, as illustrated in FIG. 14, the cable 5 is pulled along the front-and-rear direction "x" in an "x2" direction being a direction opposite to the insertion direction "x1" to locate the section "K" of the cable 5 at the opening end face 67*j* of the opening portion 63*a*, or the vicinity thereof. When the section "K" of the cable 5 is placed in the vicinity of the opening portion 63*a* in this manner, it is preferable to locate the section "K" at a position where the cover portion 65 does not collide with the cable 5 when the cover portion 65 is subsequently rotated.

Figure 15:
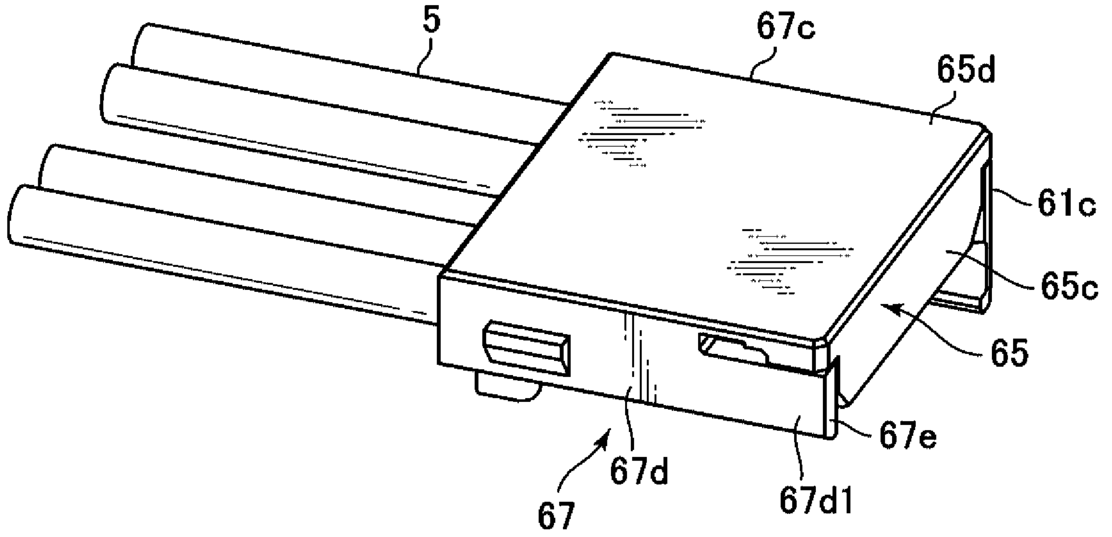
FIG. 15 is a diagram illustrating the method for mounting the cable on the cable holding member in stages.

Lastly, the cover portion 65 is rotated in the direction where the second portion 65*d* approaches the main body 67, that is, the "θ" direction illustrated in FIG. 14. As a result, as illustrated in FIG. 15, the first portion 65*c* of the cover portion 65 can cover the section "K" of the cable 5 that is placed on the other end side (m) of the through-hole 63, in other words, the plane (the y-z plane) that intersects with the "x1" direction where the cable 5 is inserted, at the opening end face 67*j* of the opening portion 63*a* or the vicinity thereof. Moreover, the second portion 65*d* of the cover portion 65 can cover the open portion of the through-hole 63 (the upper open portion of the cable mounting portion 63*c*) that is located on the one end side (n) relative to the opening end face 67*j* of the opening portion 63*a*. As a result, it is possible to effectively prevent the production of a dielectric breakdown between the shell 30 to be subsequently mounted and the inner conductor 5*a* of the cable 5. The length of the second portion 65*d* in the width direction "y" is set slightly less than the length of the first portion 65*c* in the width direction "y". Hence, even when the cover portion 65 is rotated in the "θ" direction in this manner, the first portion 65*c* does not collide with the extension portions 61 and 67*d*1 of the side surfaces 67*c* and 67*d* (refer to, for example, FIGS. 4 and 8).

Figure 16:
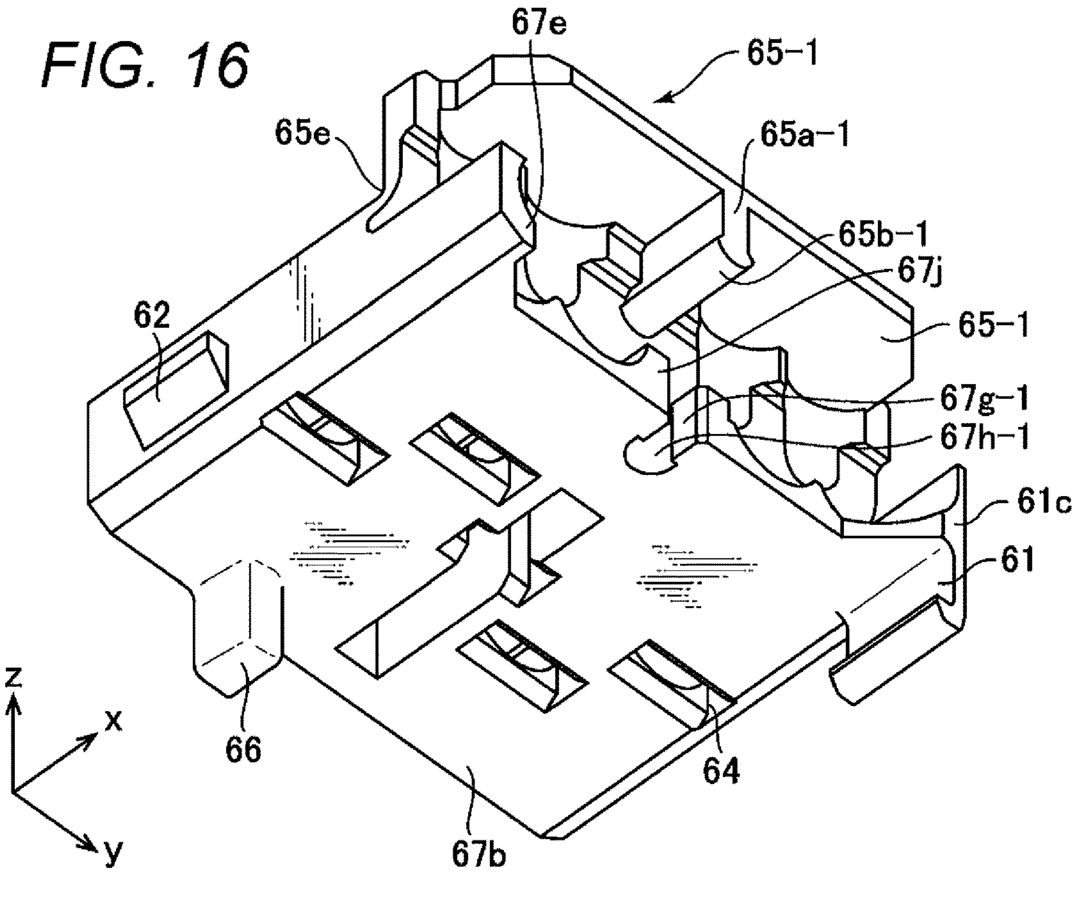
FIG. 16 is a perspective view illustrating a modification of the cable holding member.

FIG. 16 illustrates the modification of the cable holding member 60. FIG. 16 is a perspective view of the front of the cable holding member 60 as viewed from below as in FIG. 9 of the embodiment. In FIG. 16, the same reference numerals are assigned to the same members as those of the embodiment illustrated in, for example, FIG. 1, and "-1" is added to the ends of the reference numerals of the corresponding members. In the modification, in contrast to the embodiment illustrated in, for example, FIG. 1, the cover portion 65-1 is provided with only one pair of the protruding portion 65*a*-1 and the recessed portion 67*g*-1. Moreover, the pair of the protruding portion 65*a*-1 and the recessed portion 67*g*-1 is provided in the center in a direction of the length of the cover portion 65-1, in other words, in the center in the arrangement direction "y" of the through-holes 63 to ensure a latch force.

Another modification of the cable holding member 60 is described with reference to FIGS. 17 to 25. The same reference numerals are assigned to substantially the same members as those of the embodiment illustrated in, for example, FIG. 1 in FIGS. 17 to 25, and detailed descriptions thereof are omitted. In the other modification, a latching means provided between the main body 67 and a cover portion 80 of the cable holding member 60 is different from the embodiment illustrated in, for example, FIG. 1, as in the modification illustrated in FIG. 16.

Figure 17:
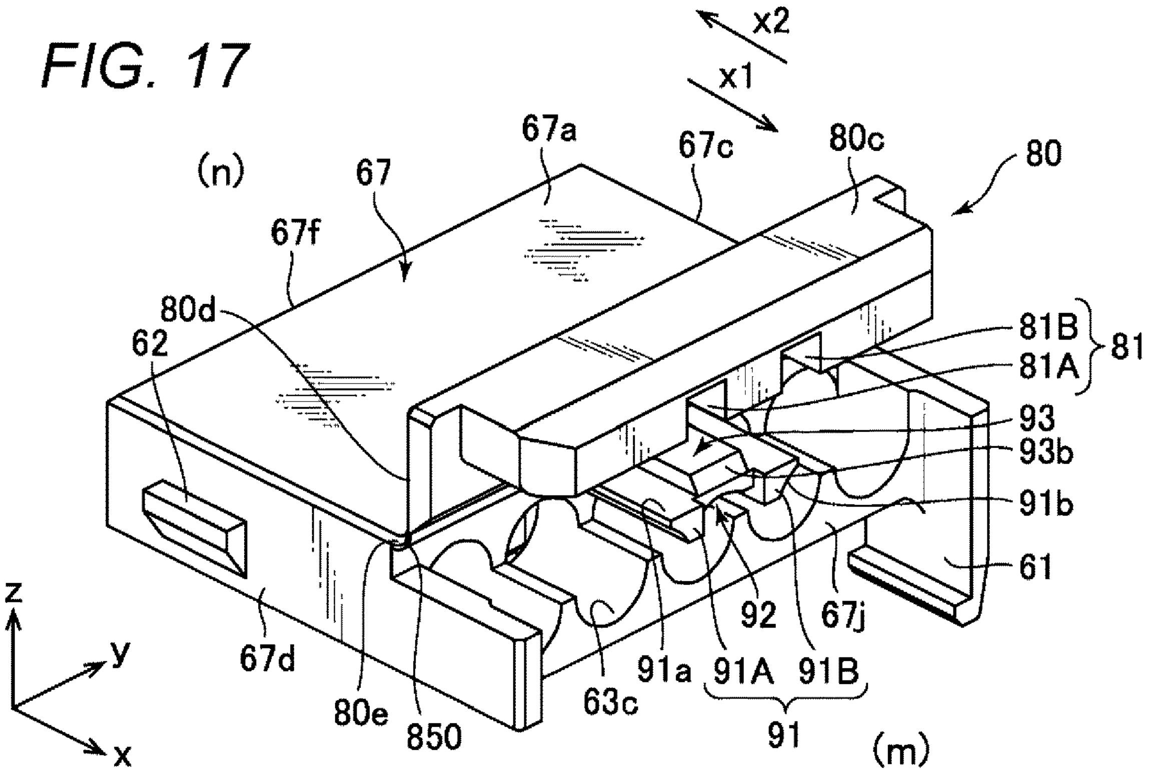
FIG. 17 is a perspective view of the cable holding member according to another modification, the perspective view corresponding to FIG. 8.
Figure 18:
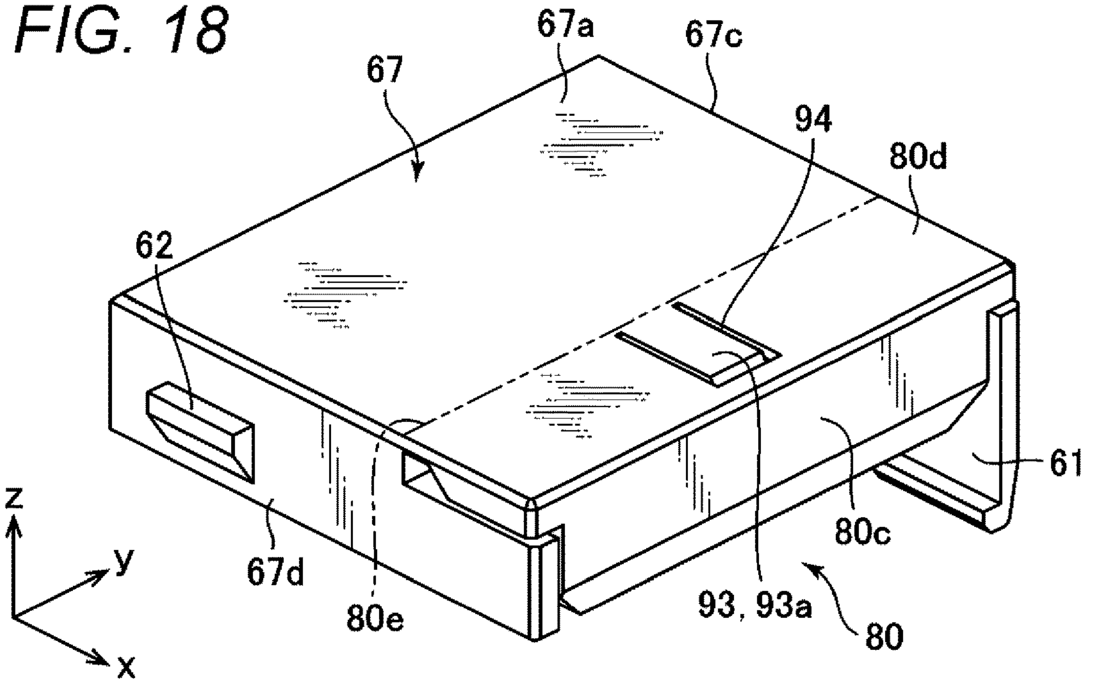
FIG. 18 is a perspective view illustrating a state of the cable holding member of FIG. 17 where a cover portion has been rotated.
Figure 19:
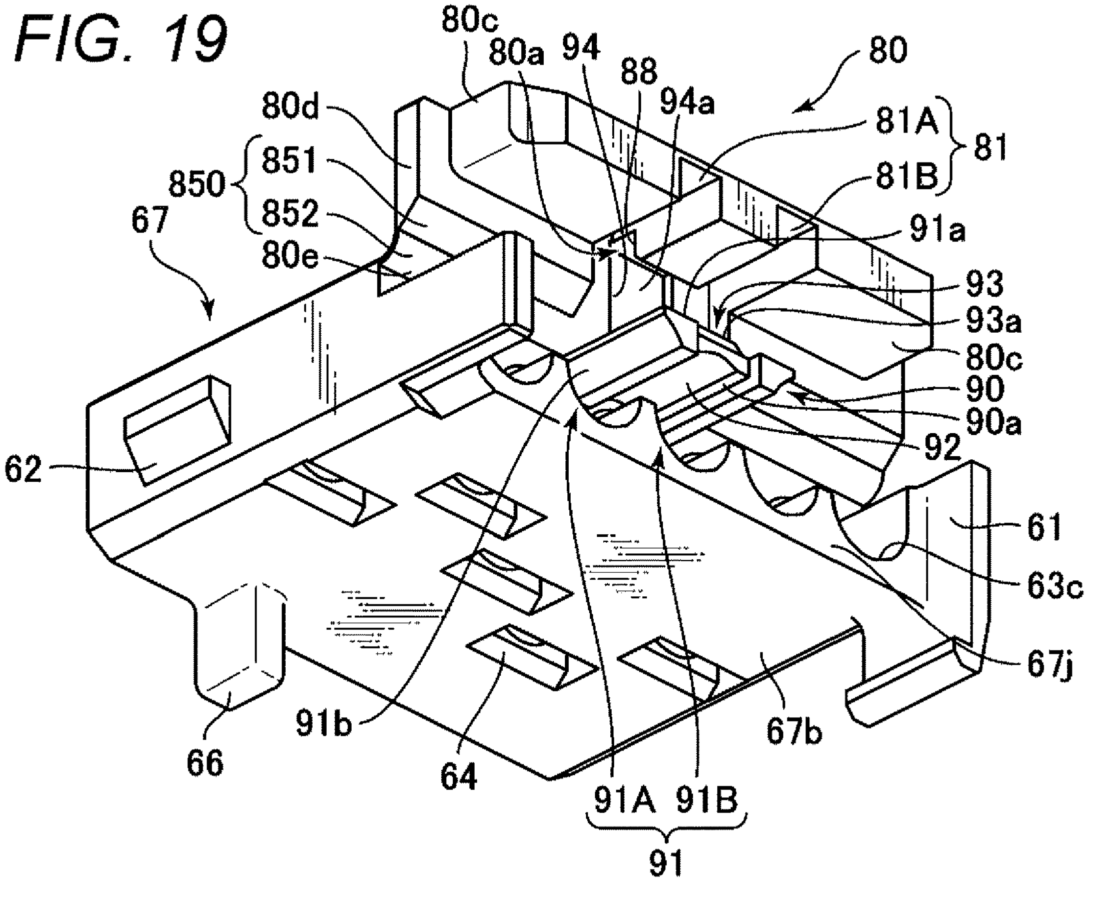
FIG. 19 is a perspective view of the cable holding member according to the other modification, the perspective view corresponding to FIG. 9.
Figure 20:
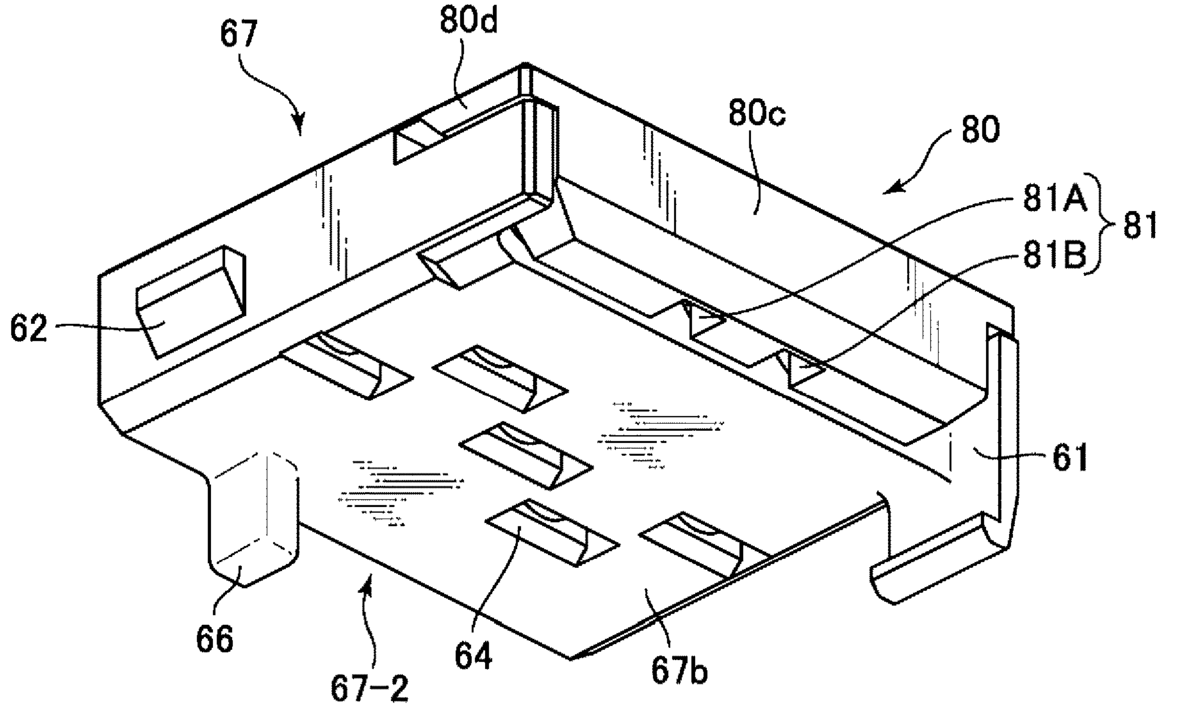
FIG. 20 is a perspective view illustrating a state of the cable holding member of FIG. 19 where the cover portion has been rotated.
Figure 21:
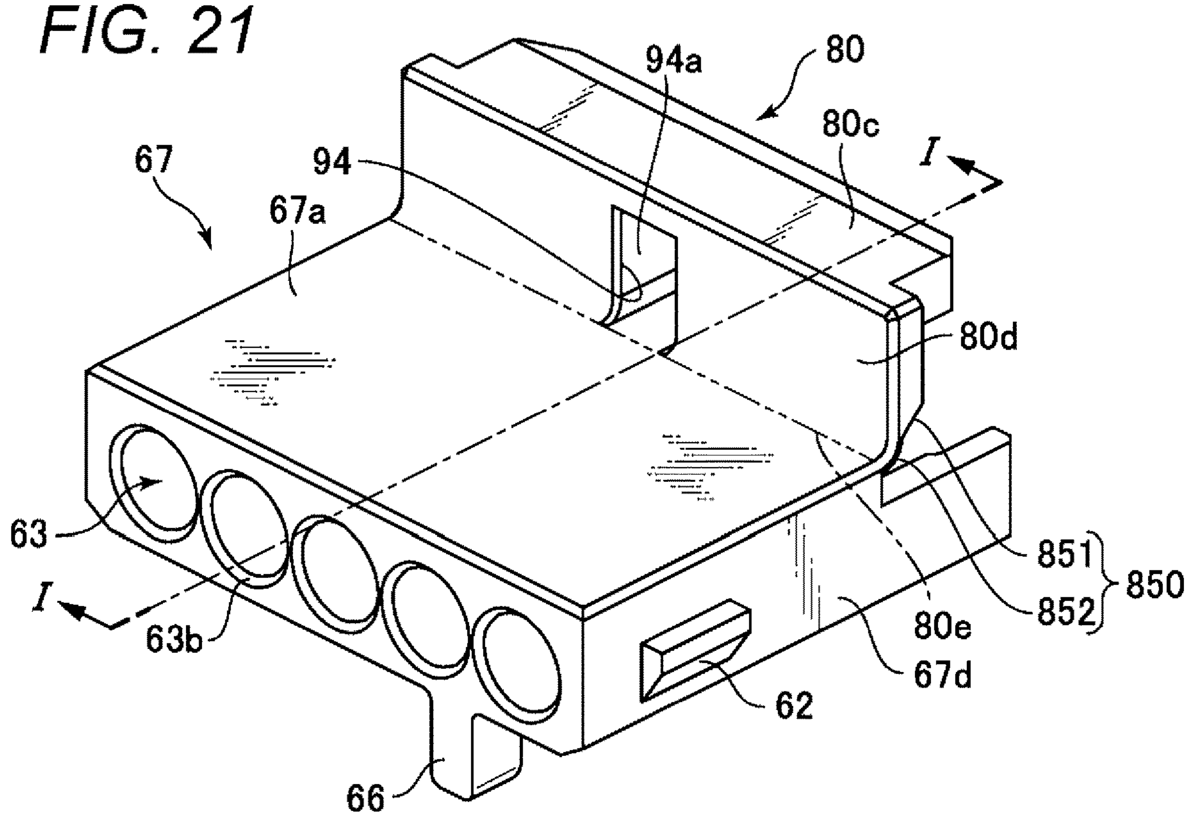
FIG. 21 is a perspective view of the cable holding member according to the other modification, the perspective view corresponding to FIG. 10.
Figure 22:
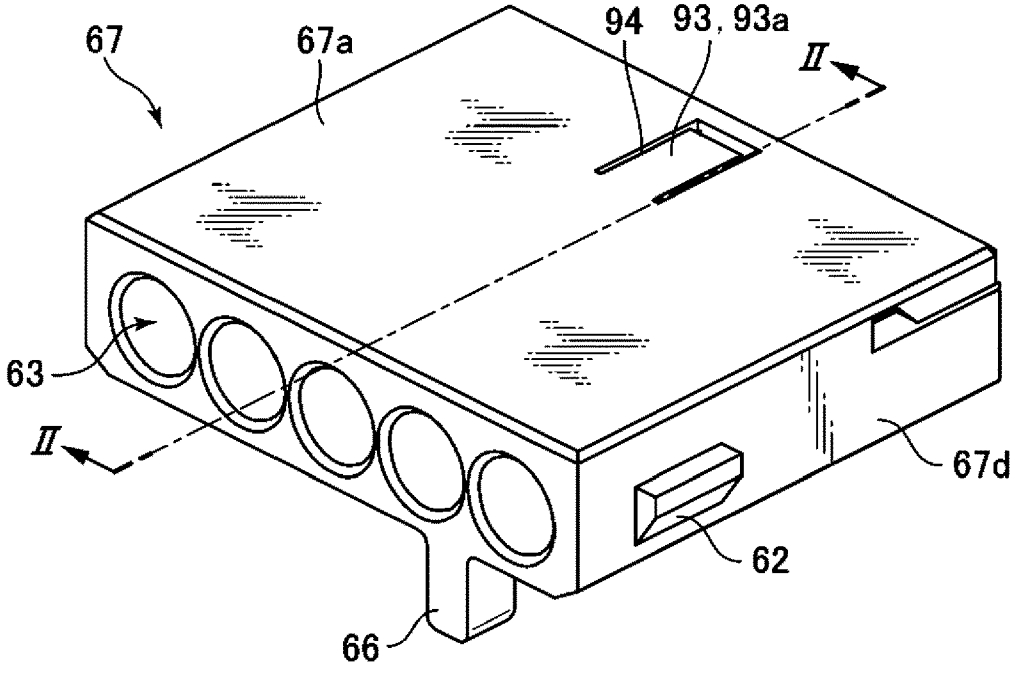
FIG. 22 is a perspective view illustrating a state of the cable holding member of FIG. 21 where the cover portion has been rotated.
Figure 23:
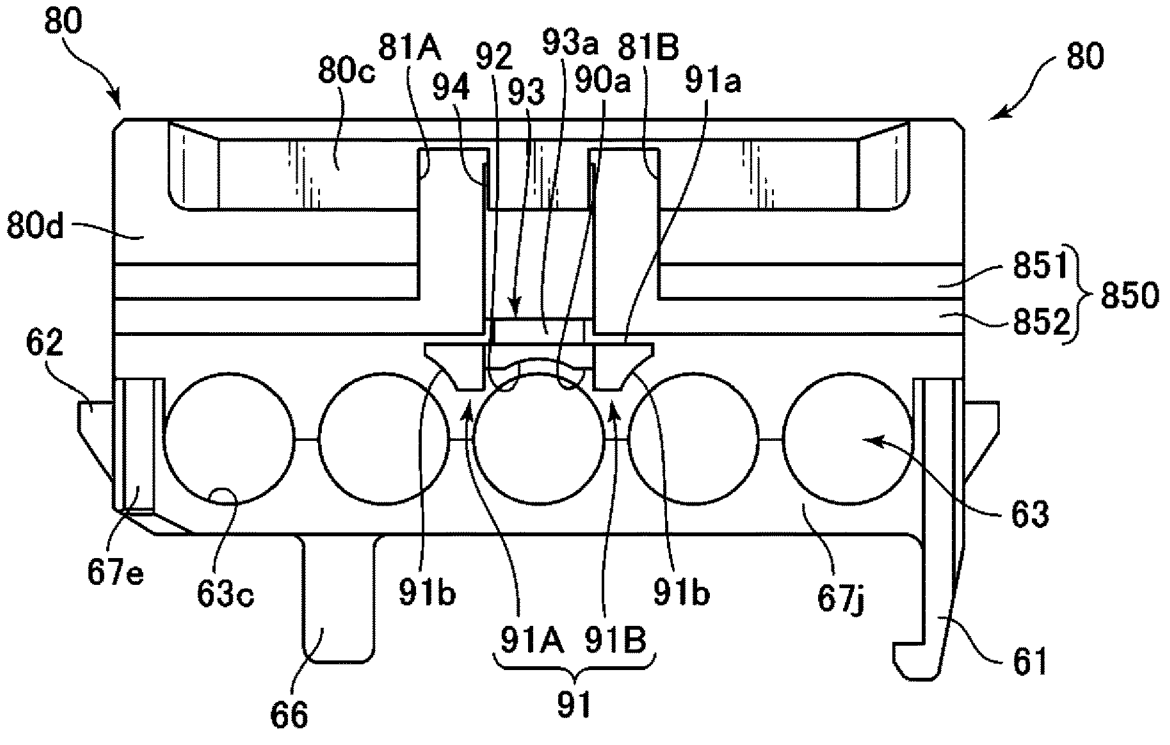
FIG. 23 is a front view of the cable holding member according to the other modification.
Figure 24:
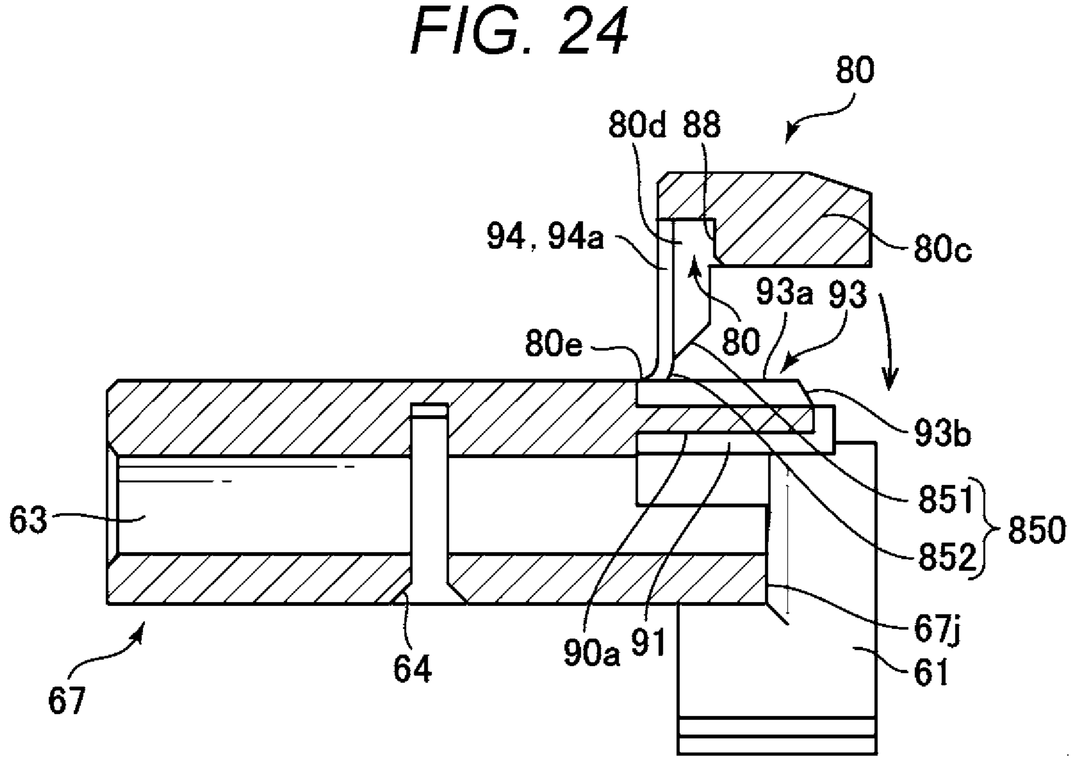
FIG. 24 is a cross-sectional view taken along line I-I in FIG. 21.
Figure 25:
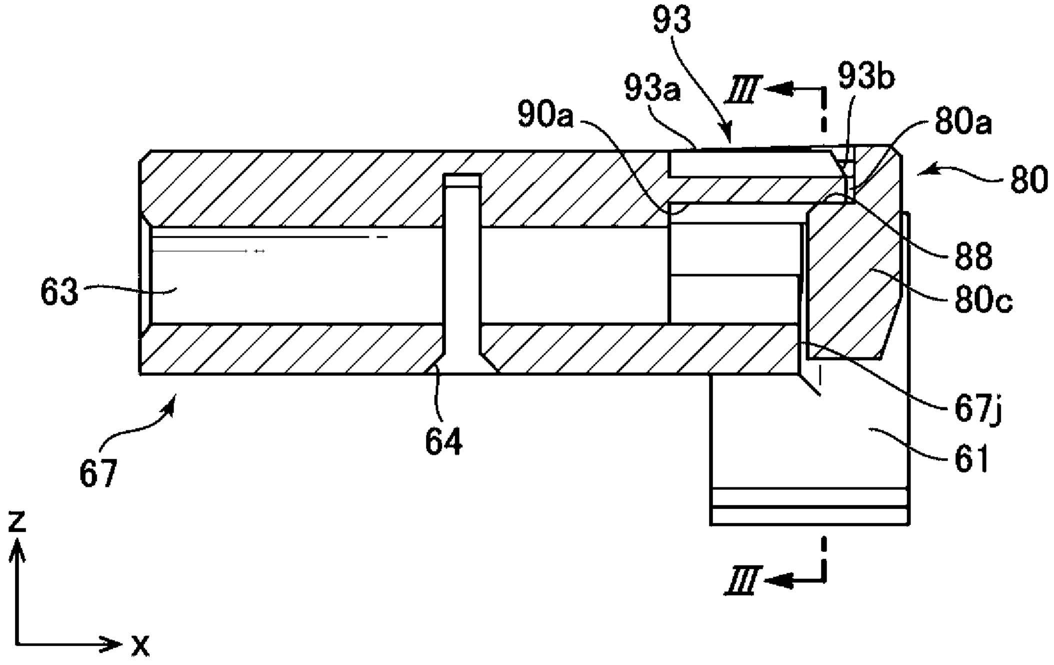
FIG. 25 is a cross-sectional view taken along line II-II in FIG. 22.
Figure 26:
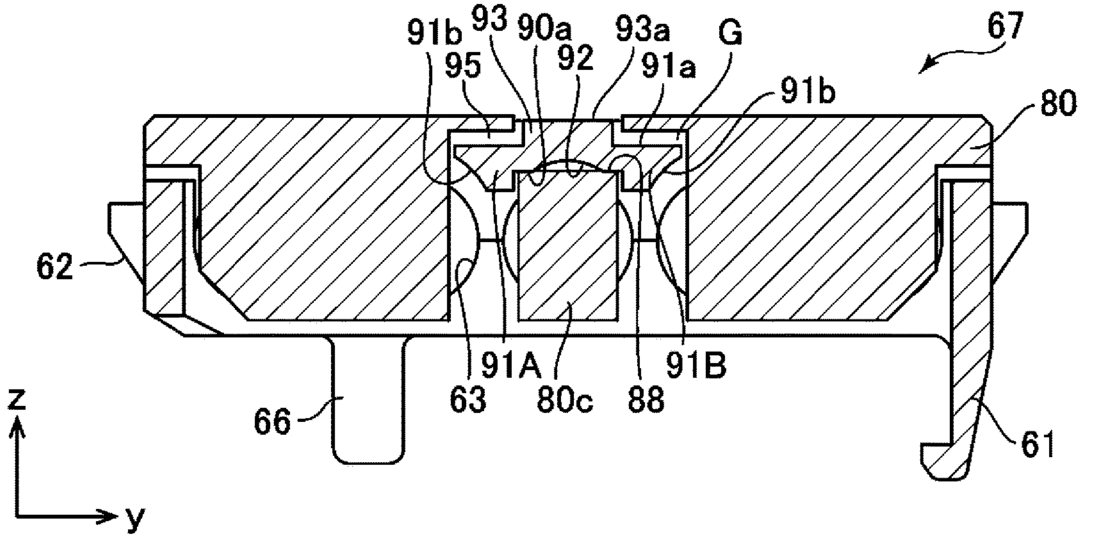
FIG. 26 is a cross-sectional view taken along line III-III in FIG. 25.

FIG. 17 is a perspective view of the cable holding member 60 according to the other modification, corresponding to FIG. 8 of the embodiment. FIG. 18 is a perspective view illustrating the state of the cable holding member 60 illustrated in FIG. 17 where the cover portion has been rotated as in FIG. 15 of the embodiment. FIG. 19 is a perspective view of the cable holding member, corresponding to FIG. 9 of the embodiment. FIG. 20 is a perspective view illustrating the state of the cable holding member 60 illustrated in FIG. 19 where the cover portion has been rotated. FIG. 21 is a perspective view of the cable holding member 60 corresponding to FIG. 10 of the embodiment. FIG. 22 is a perspective view illustrating the state of the cable holding member 60 illustrated in FIG. 21 where the cover portion has been rotated. FIG. 23 is a front view of the cable holding member 60 illustrated in, for example, FIG. 17. FIG. 24 illustrates a cross-sectional view taken along line I-I in FIG. 21, FIG. 25 a cross-sectional view taken along line II-II in FIG. 22, and FIG. 26 a cross-sectional view taken along line III-III in FIG. 25.

In the other modification, protruding latch portions 90*a* are provided as the latching means to a convex body 90 formed as a part of the main body 67 of the cable holding member 60. Moreover, recessed latched portions 88 are provided to the cover portion 80, corresponding to the protruding latch portions 90*a*.

The convex body 90 has a symmetric shape in the width direction "y", and mainly includes a main portion 93 and a rodlike body 91. The main portion 93 and the rodlike body 91 are provided in such a manner as to project from the main body 67 in the "x1" direction, or more specifically, the direction where the cover portion 80 approaches when the cover portion 80 is bent relative to the main body 67.

The main portion 93 of the convex body 90 is an approximately plate-shaped portion, and is provided in such a manner as to project in the "x1" direction beyond the opening end face 67*j* on the other end side (m) of the main body 67. The main portion 93 has a predetermined spread in the "x-y plane," and has a predetermined thickness in the thickness direction "z" (in other words, in a direction orthogonal to both of the "x1" direction where the cable 5 is inserted and the "y" direction along a bend portion 80*e*). As is clear from, for example, FIG. 18 and the following description, an upper surface 93*a* of the main portion 93 can be a part of a ceiling of the cable holding member 60 when the cover portion 80 is bent relative to the main body 67. A bottom surface (a center area 92 and the latch portions 90*a*) of the main portion 93 faces the open portion of the cable mounting portion 63*c*. Hence, the center area 92 of the bottom surface of the main portion 93, especially in the width direction "y", has an arch shape to not prevent the insertion of the cable 5 to be mounted on the cable mounting portion 63*c*. The latch portions 90*a* are formed as slim rectangular latch surfaces that extend along the "x-y plane," at positions that sandwich both sides of the center area 92 in the width direction "y". A front surface of the main portion 93, especially in proximity to the upper surface 93*a*, is provided with a taper 93*b* in such a manner as to enable preventing the collision of the cover portion 80 with the main body 67 and latching the latch portions 90*a* of the main body 67 to the latched portions 88 of the cover portion 80 smoothly when the cover portion 80 is bent relative to the main body 67.

The rodlike body 91 of the convex body 90 includes approximately rodlike rodlike bodies 91A and 91B. The rodlike bodies 91A and 91B are provided on both sides of the main portion 93 in the width direction "y", respectively, and provided in such a manner as to project in the "x1" direction as in the main portion 93. The magnitude of the projection is set greater than that of the main portion 93, and the rodlike bodies 91A and 91B are configured in such a manner as to project beyond not only the opening end face 67*j* on the other end side (m) of the main body 67 but also the main portion 93. As a result, the rodlike bodies 91A and 91B form extension portions that are continuous to the main portion 93 and extend outward of the main portion 93 (forward of the main portion 93, that is, in the "x1" direction), in the "x-y plane." The rodlike bodies 91A and 91B are located closer in the thickness direction "z" to the through-hole 63 and the cable mounting portion 63*c* than the main portion 93. As a result, an upper surface 91*a* of the rodlike body 91 is located below the main portion 93 in the thickness direction "z". Outer side surfaces 91*b* of the rodlike bodies 91A and 91B in the width direction "y" face the open portions of the cable mounting portions 63*c* as in the center area 92 on the bottom surface of the main portion 93. Hence, the side surface 91*b* of each of the rodlike bodies 91A and 91B has an arch shape to not prevent the insertion of the cable 5 to be mounted on the cable mounting portion 63*c*.

The cover portion 80 has an approximate L shape in side view as in the cover portion 65 illustrated in, for example, FIG. 1 of the embodiment, and includes a first portion 80*c* and a second portion 80*d*.

The first portion 80*c* is provided with receiving portions 81A and 81B, corresponding to the rodlike bodies 91A and 91B, respectively. The receiving portions 81A and 81B have a recessed indentation shape along the "x1" direction in such a manner as to be able to receive the rodlike bodies 91A and 91B when the cover portion 80 is bent relative to the main body 67. The first portion 80*c* is further provided, near a portion coupled to the second portion 80*d*, with a groove 80*a* in such a manner as to cause the receiving portions 81A and 81B to communicate with each other through the groove 80*a* in the width direction "y". A latched surface that extends along the "x-y plane" can be a part of the groove 80*a* near each of the latch portions 90*a* provided on the convex body 90 when the cover portion 80 is bent relative to the main body 67. The latched portion 88 is formed, using the latched surface. It is designed in such a manner that when the cover portion 80 is bent relative to the main body 67, a latch surface of the latch portion 90*a* provided on the convex body 90 of the main body 67 faces the latched surface of the latched portion 88 provided to the cover portion 80, and these surfaces are brought into contact with each other. As a result, the cover portion 80 is latched to the main body 67.

The second portion 80*d* is provided with a through-hole 94*a* penetrating the cover portion 80 in the thickness direction "z", using a slit 94. In the modification, the through-hole 94*a* has an approximately rectangular shape as illustrated in FIG. 21. However, the shape of the through-hole 94*a* is not limited to this shape. The main portion 93 of the convex body 90 has a shape fitting in the through-hole 94*a* in the "x-y plane," and is set in dimensions smaller than the through-hole 94*a*. Hence, when the cover portion 80 is bent relative to the main body 67, the main portion 93 enters the through-hole 94*a* in the thickness direction "z". In other words, the main portion 93 of the convex body 90 overlaps with the through-hole 94*a* in at least a part of an area in the "x-y plane" with the cover portion 80 bent relative to the main body 67 (refer to FIGS. 18 and 22). Therefore, the through-hole 94*a* is blocked.

As described above, the rodlike bodies 91A and 91B are formed as the extension portions extending outward of the main portion 93 in the "x-y plane." Moreover, the rodlike bodies 91A and 91B are located closer in the thickness direction "z" to the cable mounting portion 63*c* than the main portion 93. Hence, when the cover portion 80 is bent relative to the main body 67, the rodlike bodies 91A and 91B completely block, in the "x-y plane," a gap created by the slit 94 that is formed in the second portion 80*d* to provide the through-hole 94*a*.

Furthermore, the rodlike bodies 91A and 91B formed as the extension portions have the function of increasing a creepage distance. In the configuration illustrated in FIG. 26, it is configured in such a manner as to form a gap "G", for example, between the upper surfaces 91*a* of the rodlike bodies 91A and 91B and the cover portion 80 in such a manner as to separate the main portion 93 and the rodlike bodies 91A and 91B from the cover portion 80 even when the cover portion 80 is bent relative to the main body 67. As a result, an electric signal that has entered the cable holding member 60 through, for example, the slit 94 flows through the upper surface 91*a* of the rodlike body 91 and then through the arch-shaped side surface 91*b*. Hence, it is possible to reduce the possibility of an adverse effect on the cable 5. As described with reference to, for example, FIG. 7, the cable holding member 60 is covered by the shell 30 during actual use. Therefore, there is a high possibility of an adverse effect on the cable 5. However, the above configuration allows completely blocking the slit 94 in the "x-y plane." Therefore, it is possible to effectively remove or reduce such an adverse effect.

A modification of the latching means is described with reference to FIGS. 27 to 38. However, a detailed description of matters similar to the members of the embodiment illustrated in, for example, FIG. 1 is omitted as in the other modification of the cable holding member 60 illustrated in, for example, FIG. 17.

Figure 27:
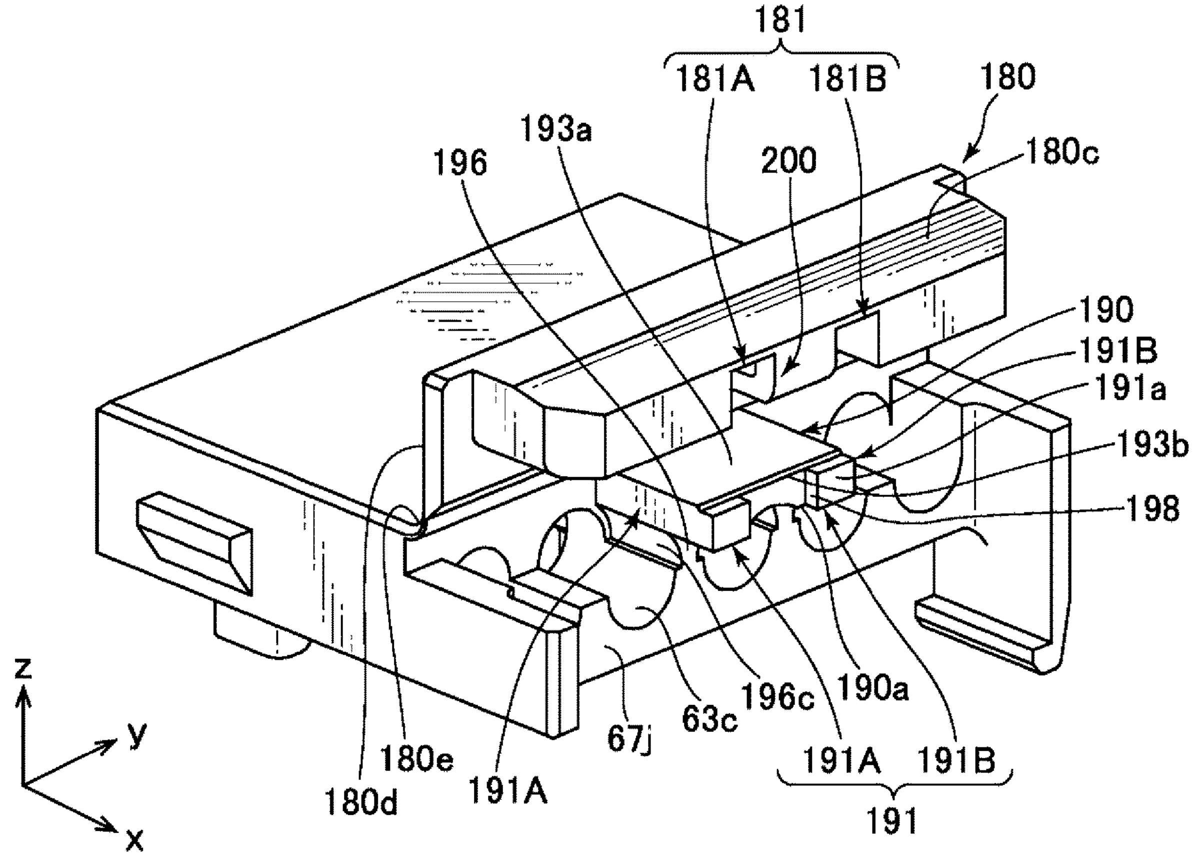
FIG. 27 is a diagram illustrating a modification of a latching means of the cable holding member, the diagram corresponding to FIG. 17.
Figure 28:
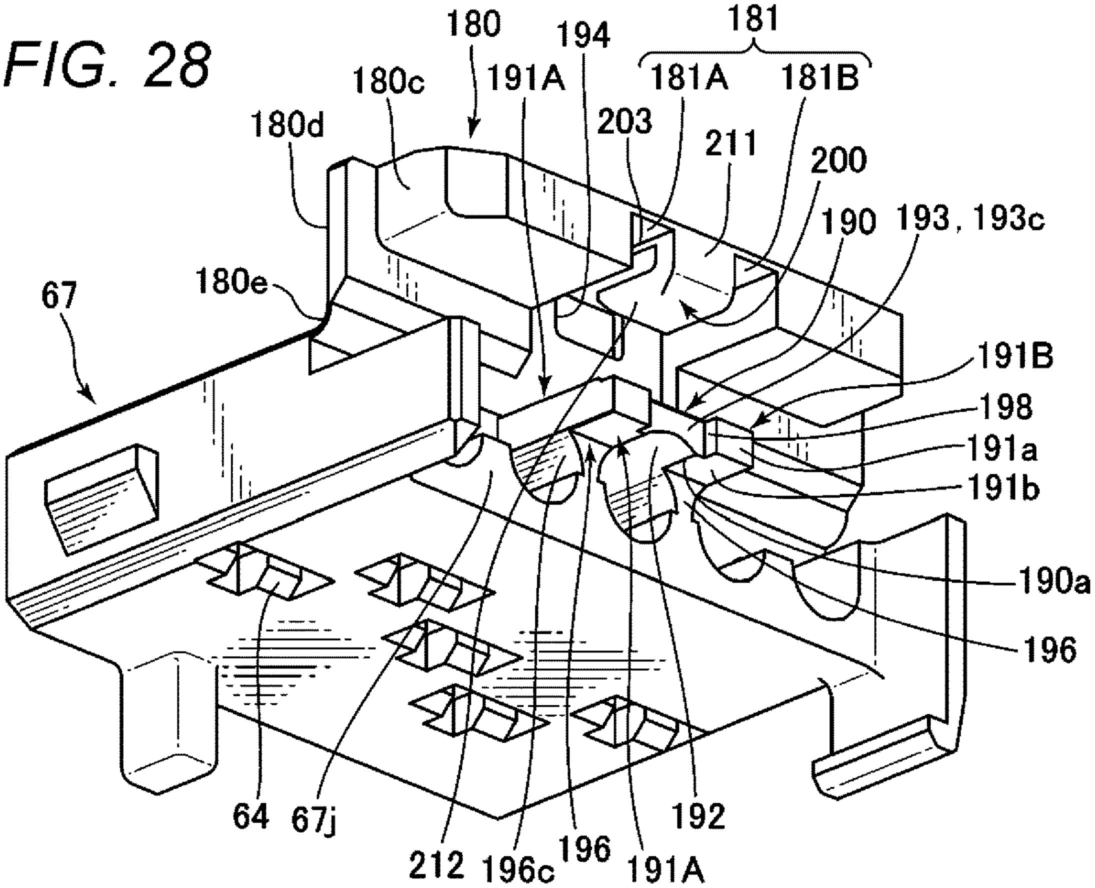
FIG. 28 is a diagram illustrating the modification of the latching means of the cable holding member, the diagram corresponding to FIG. 19.
Figure 29:
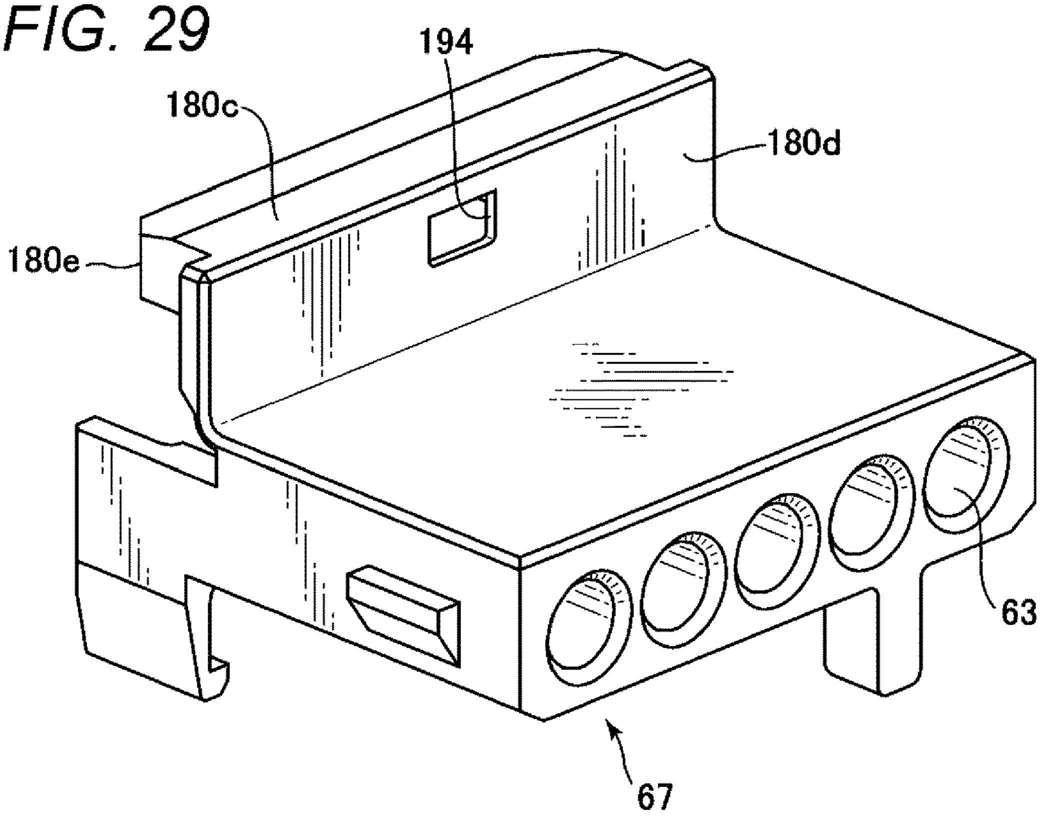
FIG. 29 is a diagram illustrating the modification of the latching means of the cable holding member, the diagram corresponding to FIG. 21.
Figure 30:
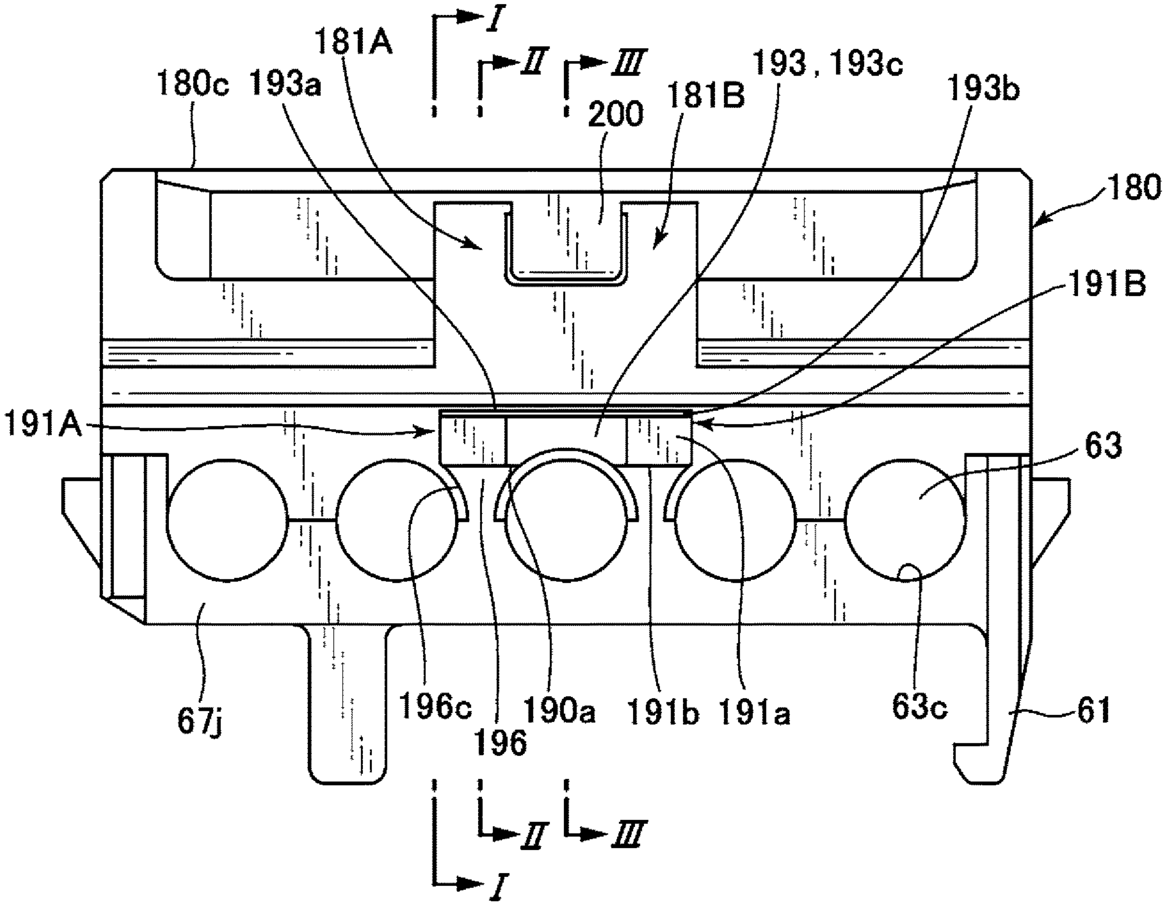
FIG. 30 is a front view of the cable holding member illustrated in, for example, FIG. 27.

FIGS. 27, 28, and 29 of the modification are perspective views of the cable holding member 60 in a state before the cover portion is rotated. FIG. 30 is a front view thereof. FIGS. 27, 28, 29, and 30 of the modification correspond to FIGS. 17, 19, 21, and 23 of the other modification of the cable holding member 60, respectively.

Figure 31:
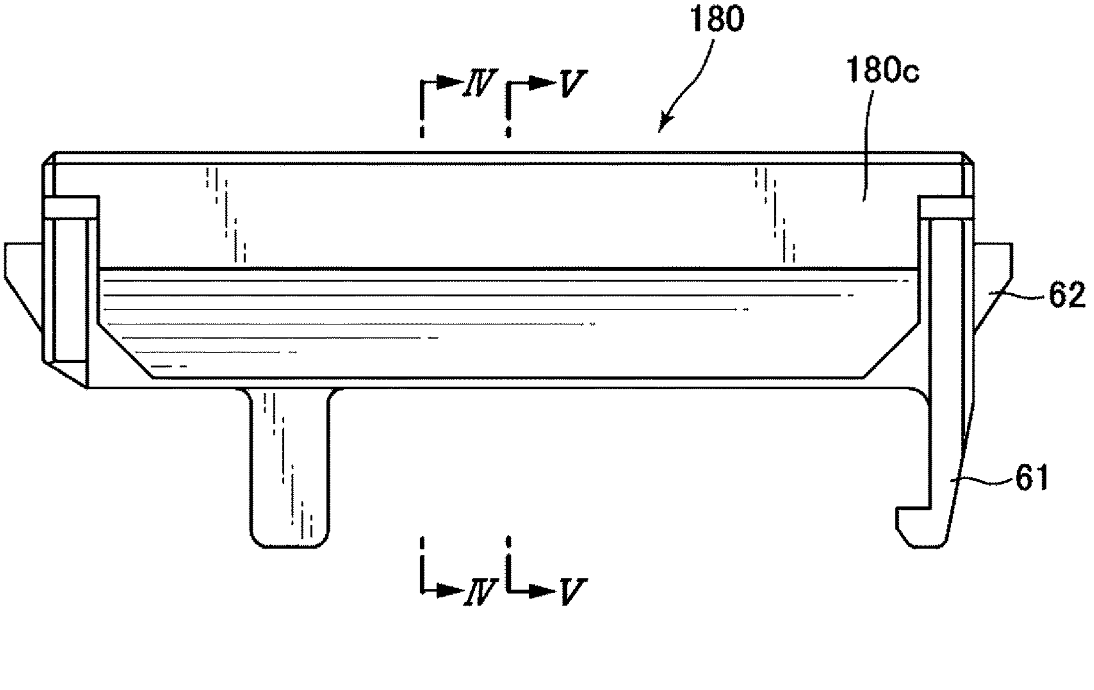
FIG. 31 is a front view of the cable holding member illustrated in, for example, FIG. 27.

FIG. 31 is a front view of the cable holding member in a state after the cover portion is rotated, in contrast to FIGS. 27 to 30.

Figure 32:
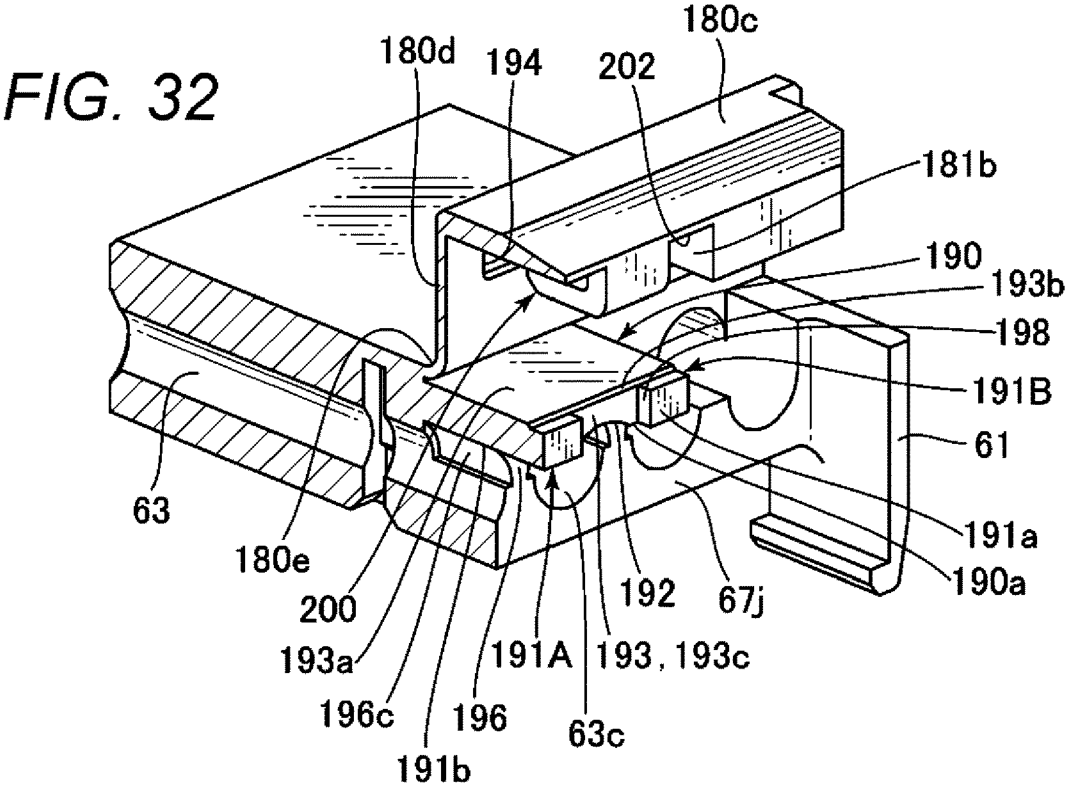
FIG. 32 is a partial cross-sectional perspective view taken along line I-I in FIG. 30.
Figure 33:
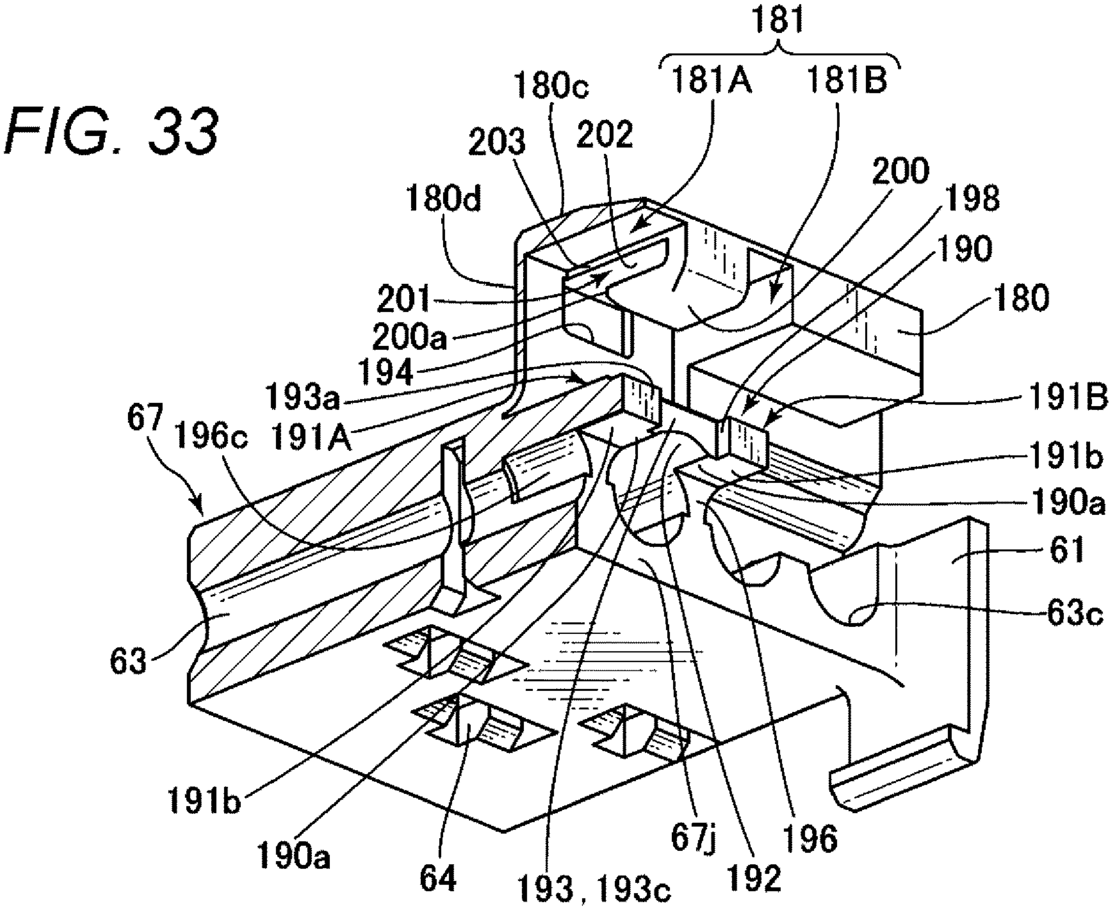
FIG. 33 is a partial cross-sectional perspective view taken along line I-I in FIG. 30.
Figure 34:
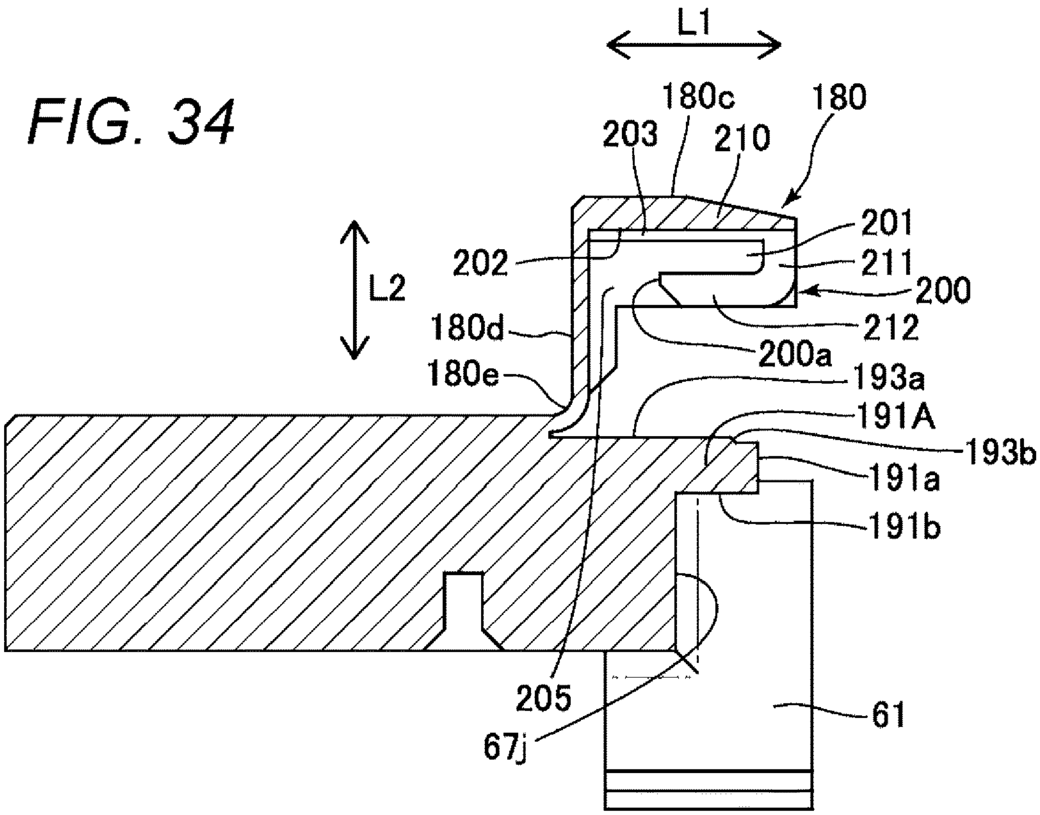
FIG. 34 is a cross-sectional view taken along line II-II in FIG. 30.
Figure 35:
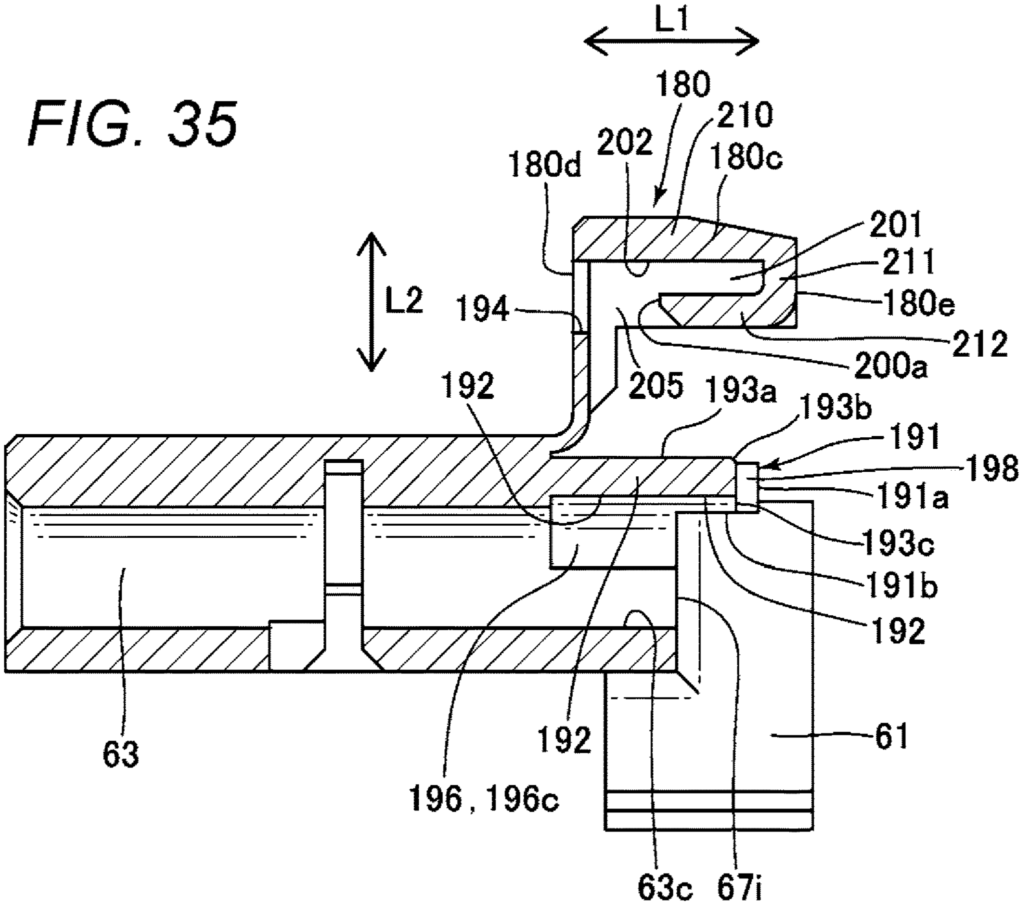
FIG. 35 is a cross-sectional view taken along line III-III in FIG. 30.
Figure 36:
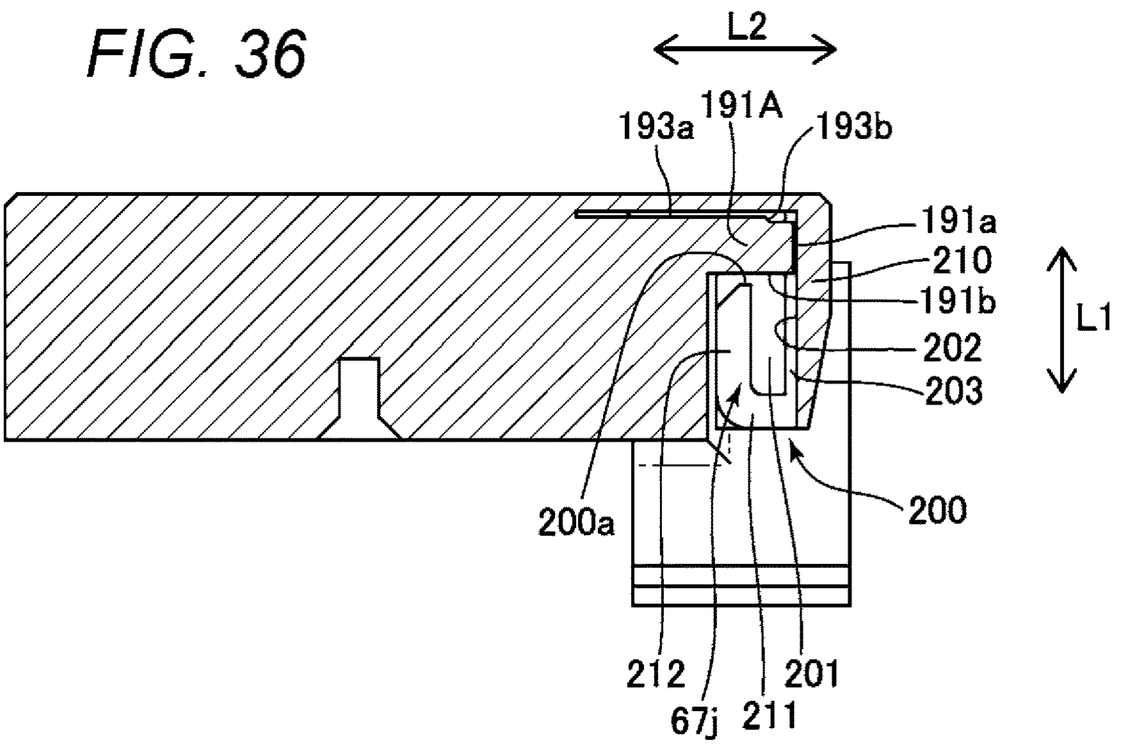
FIG. 36 is a cross-sectional view taken along line IV-IV in FIG. 31.
Figure 37:
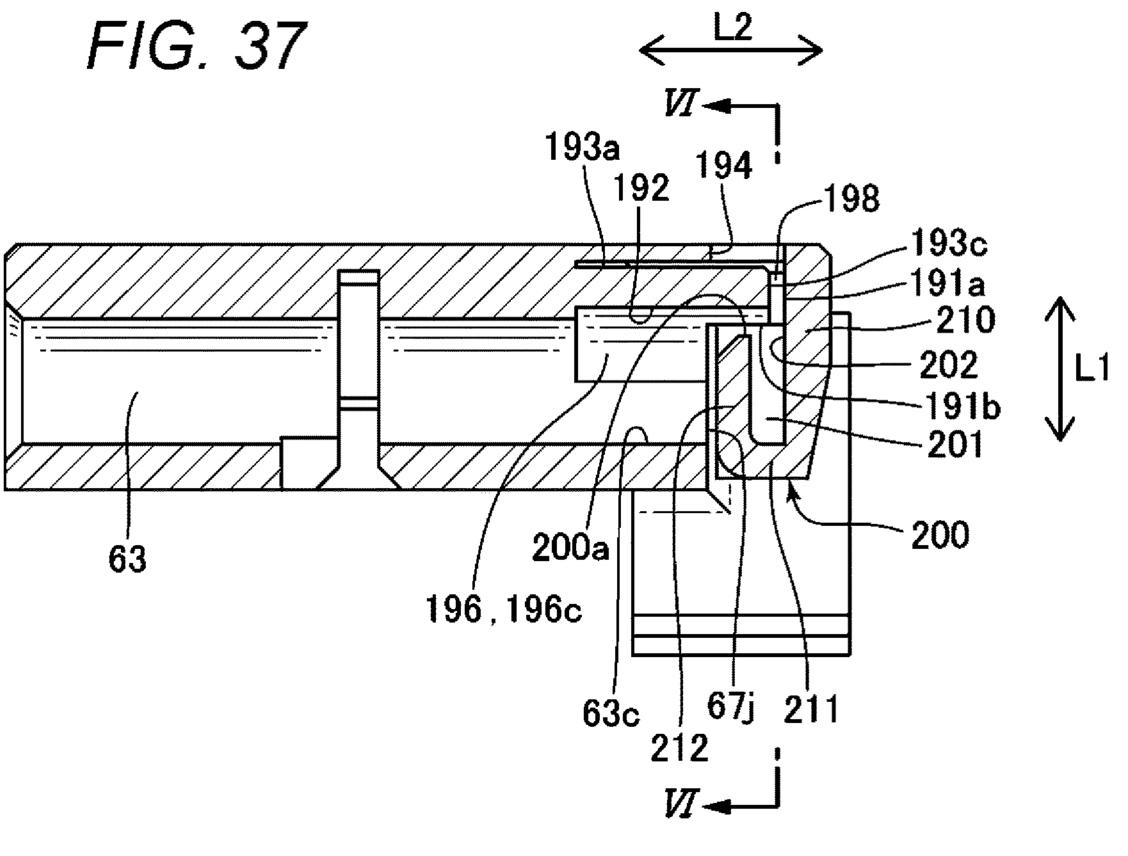
FIG. 37 is a cross-sectional view taken along line V-V in FIG. 31.
Figure 38:
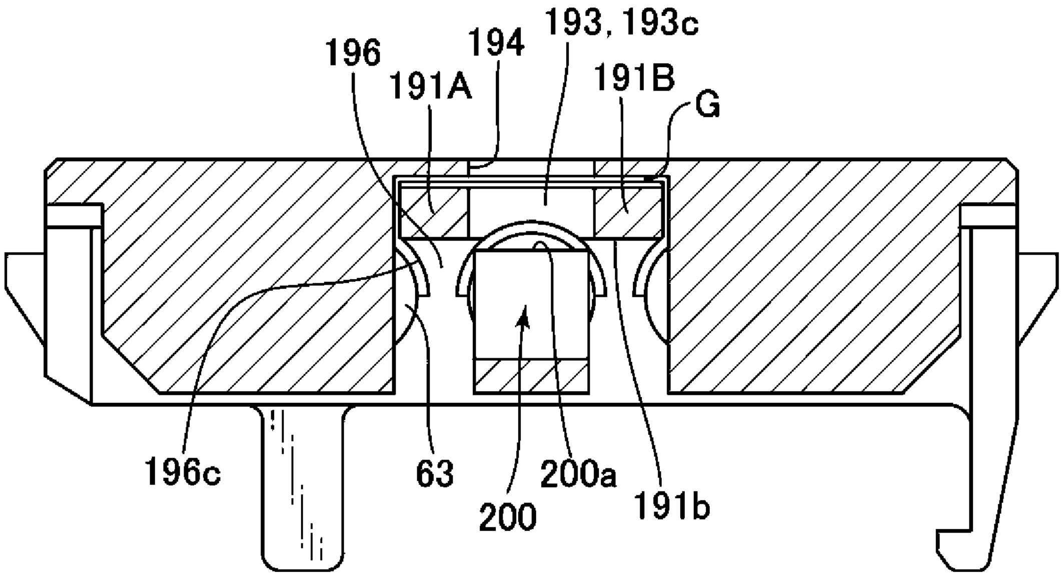
FIG. 38 is a cross-sectional view taken along line VI-VI in FIG. 37.

FIGS. 32 and 33 are diagrams illustrating the partial cross-sectional view taken along line I-I in FIG. 30 as viewed at different angles from above and from below, respectively. FIGS. 34 and 35 are diagrams illustrating cross-sectional views taken along line II-II and line III-III in FIG. 30, respectively. FIGS. 36 and 37 are cross-sectional views taken along line IV-IV and line V-V in FIG. 31, respectively. FIG. 38 is a cross-sectional view taken along line VI-VI in FIG. 37.

In the modification, protruding latch portions 190*a* similar to those of the modification illustrated in, for example, FIG. 17 are provided as the latching means. On the other hand, in contrast to the modification illustrated in, for example, FIG. 17, a cover portion 180 includes an elastically displaceable elastic piece 200 that is supported in a cantilever form, and the elastic piece 200 is provided with a latched portion 200*a*.

A convex body 190 has a symmetric shape in the width direction "y", and mainly includes a main portion 193 and a projection portion 191. The main portion 193 and the projection portion 191 are provided in such a manner as to project from the main body 67 in the "x1" direction, or more specifically, the direction where the cover portion 180 approaches when the cover portion 180 is bent relative to the main body 67.

The main portion 193 of the convex body 190 is an approximately plate-shaped portion, and is provided in such a manner as to project in the "x1" direction beyond the opening end face 67*j* of the main body 67. The main portion 193 has a predetermined spread in the "x-y plane," and has a predetermined thickness in the thickness direction "z", that is, the direction orthogonal to both of the "x1" direction where the cable 5 is inserted and the width direction "y" along a bend portion 180*e*. A bottom surface (a center area 192 and the latch portions 190*a*) of the main portion 193 faces the open portion of the cable mounting portion 63*c*. Hence, the center area 192 of the bottom surface of the main portion 193, especially in the width direction "y", has an arch shape to not prevent the insertion of the cable 5 to be mounted on the cable mounting portion 63*c*. The latch portions 190*a* are formed as slim rectangular latch surfaces that extend along the "x-y plane," at positions that sandwich both sides of the center area 192 in the width direction "y". A front surface 193*c* of the main portion 193, especially in proximity to an upper surface 193*a*, is provided with a step portion 193*b* in such a manner as to enable preventing the collision of the cover portion 180 with the main body 67 and latching the latch portions 190*a* of the main body 167 to the latched portion 200*a* of the cover portion 180 smoothly when the cover portion 180 is bent relative to the main body 67.

The projection portion 191 of the convex body 190 includes projection portions 191A and 191B. The projection portions 191A and 191B are provided on both sides of the main portion 193 in the width direction "y", that is, at positions that sandwich the main portion 193, respectively, and provided in such a manner as to project in the "x1" direction as in the main portion 193. The magnitude of the projection is set greater than that of the main portion 193, and the projection portions 191A and 191B are configured in such a manner as to project beyond not only the opening end face 67*j* of the main body 67 but also the main portion 193. As a result, the front surface 193*c* of the main portion 193 and a front surface 191*a* of the projection portion 191 form a recessed step portion 198 along the "x" direction. The step portion 198 is used as a portion that receives a part of the elastic piece 200. The projection portions 191A and 191B form extension portions that are continuous to the main portion 193 and extend outward of the main portion 193 (forward of the main portion 193, that is, in the "x1" direction), in the "x-y plane." The upper surface of the projection portion 191 forms a surface continuous to the upper surface 193*a* of the main portion 193. Moreover, in the thickness direction "z", a side, which is closer to the cable mounting portion 63*c*, of each of the projection portions 191A and 191B (a bottom surface-side of each of the projection portions 191A and 191B) is supported by a support portion 196. Hence, the strength of the convex body 190 is greater than that of the convex body 90 illustrated in, for example, FIG. 17. As in the modification, it is preferable that the support portion 196 be provided all over the area where the cable mounting portion 63*c* is provided, more specifically, all over the area where the open portion of the cable mounting portion 63*c* is provided, along the "x" direction. Outer side surfaces 196*c* of the support portions 196 in the width direction "y" face the open portions of the cable mounting portions 63*c*, respectively, as in the center area 192 on the bottom surface of the main portion 193. Hence, each of the side surfaces 196*c* of the support portions 196 has an arch shape to not prevent the insertion of the cable 5 to be mounted on the cable mounting portion 63*c*.

The cover portion 180 has an approximate L shape in side view as in the cover portion 65 illustrated in, for example, FIG. 1 of the embodiment, and includes a first portion 180*c* extending along a first direction "L1" and a second portion 180*d* extending along a second direction "L2".

The first portion 180*c* is provided with receiving portions 181A and 181B, corresponding to the projection portions 191A and 191B, respectively. The receiving portions 181A and 181B have a recessed indentation shape along the "x1" direction in such a manner as to be able to receive the projection portions 191A and 191B when the cover portion 180 is bent relative to the main body 67. The elastic piece 200 is formed on the first portion 180*c*. The elastic piece 200 is formed by use of the thickness of the first portion 180*c* in the "x-z plane," that is, the thickness in the "x-z plane" near the center in the width direction "y" in the modification. Moreover, the first portion 180*c* includes an outer wall portion 210 extending along the first direction "L1."

The elastic piece 200 includes a first piece portion 211 and a second piece portion 212. The first piece portion 211 extends along the second direction "L2" from one end of the outer wall portion 210 forming a part of the first portion 180*c* (an end of the outer wall portion 210, which is on a side opposite to a side connected to the second piece portion 212 in the first direction "L1"). The second piece portion 212 is folded back toward the second portion 180*d* from one end of the first piece portion 211, for example, a distal end of the first piece portion 211, and extends along the first direction "L1". The outer wall portion 210, the first piece portion 211, and the second piece portion 212 form an approximate C shape. A displacement space 201 is provided between the outer wall portion 210 and the second piece portion 212 (refer to, for example, FIG. 34). The first piece portion 211 and the second piece portion 212 are provided, straddling the receiving portion 181A and the receiving portion 181B in the width direction "y", and are supported by the outer wall portion 210 in a cantilever form.

In the modification, an end face of the second piece portion 212 (an end face at a distal end of the second piece portion 212 in the first direction "L1") functions as the latched portion 200*a*. A gap 205 that can hold a part of the convex body 190 when the cover portion 180 is bent relative to the main body 67 is formed in a direction along the first direction "L1" between the latched portion 200*a* and the second portion 180*d*. The first piece portion 211 and the second piece portion 212, which are elastically supported in a cantilever form, come into contact with the convex body 190 when the part of the convex body 190 is held in the gap 205. With this contact, the first piece portion 211 and the second piece portion 212, which are elastically supported in a cantilever form, are elastically displaced at least in the "x" direction along the "x1" direction where the cable 5 is inserted, by use of the displacement space 201 provided between the outer wall portion 210 and the second piece portion 212. The latched portion 200*a* is latched to the latch portions 190*a* provided to the convex body 190 by use of the elastic displacement. As a result, the cover portion 180 is latched to the main body 67.

As illustrated in FIGS. 28, 33, and 34, the elastic piece 200 includes a protruding step portion 203 projecting toward an inner wall 202 of the outer wall portion 210 along the second direction "L2." As illustrated in, for example, FIGS. 36 and 37, the step portion 203 of the elastic piece 200 is received in the recessed step portion 198 of the convex body 190, the step portion 198 being formed by the main portion 193 and the projection portion 191, when the cover portion 180 is bent relative to the main body 67. Moreover, at the same time, a part of the inner wall 202 of the outer wall portion 210 can come into contact with the front surface 191*a* of the projection portion 191 on sides of the elastic piece 200 in the width direction "y". With such a configuration, the cover portion 180 can position the elastic piece 200 at a predetermined position of the convex body 190, and prevent the cover portion 180 from approaching the main body 67 excessively, when the cover portion 180 is bent relative to the main body 67. Note than the strength of the convex body 190 is enhanced by providing the support portions 196. Therefore, the risk of breaking the convex body 190 due to the contact with the cover portion 180 is reduced.

As illustrated in, for example, FIGS. 28, 29, and 35, the second portion 180*d* is provided with a through-hole 194 penetrating the cover portion 180 in the thickness direction "z". The through-hole 194 is a portion formed by installing a mold in a predetermined place upon molding the cable holding member 60 to form the elastic piece 200. As illustrated in, for example, FIGS. 37 and 38, it is configured in such a manner that at least a part of an area on the continuous surface formed by the upper surface 193*a* of the main portion 193 and the upper surface of the projection portion 191 overlaps with the through-hole 194 when the cover portion 180 is bent relative to the main body 67; therefore, the through-hole 194 is completely blocked in the "x-y plane."

As in the modification illustrated in, for example, FIG. 17, the projection portions 191A and 191B formed as the extension portions have the function of increasing a creepage distance. As is clearly illustrated in FIG. 38, also in this configuration, it is configured in such a manner that the gap "G" is formed, for example, between the upper surface of the projection portions 191A and 191B (the surface continuous to the upper surface 193*a*) and the cover portion 180 in such a manner as to separate the main portion 193 and the projection portions 191A and 191B from the cover portion 180 when the cover portion 180 is bent relative to the main body 67. As a result, an electric signal that has entered the cable holding member 60 through, for example, the through-hole 194 flows over, for example, the upper surface of the projection portion 191 (the surface continuous to the upper surface 193*a*). Hence, it is possible to reduce the possibility of an adverse effect on the cable.

The present disclosure is not limited to the above-mentioned embodiment. Other various modifications can be made to the present disclosure. For example, in the embodiment, the bendable cover portion 65 is provided as a part of the main body 67. However, the cover portion 65 is simply required to be capable of covering one end of the cable 5 to prevent a dielectric breakdown, and is not necessarily provided as a part of the main body 67. Moreover, there is no need to make the cover portion 65 bendable, either. Strictly speaking, the cover portion 65 is simply required to be provided as a covering member that can cover the opening end face 67*j* of the opening portion 63*a* or the vicinity thereof and prevent a dielectric breakdown. Hence, for example, the cover portion 65 may be connected to the main body 67 with a hinge separately from the main body 67. Moreover, if the above object can be achieved, the shape of the cover portion 65 or the covering member is not particularly limited, and does not necessarily have a plate shape. The thickness of, for example, the bend portion is not limited, either. For example, the cover portion 65 may have a rounded shape, or a shape with a thickness. In this manner, the drawings and description of the present application are simply exemplifications. The present disclosure is not limited to the drawings and description.

It is clear that those skilled in the art related to the present disclosure can devise many amended forms or other embodiments of the present disclosure with the assistance of the teaching in the above description and that those skilled in the art can modify and amend the present disclosure without departing from the scope or gist of the present disclosure. Therefore, it should be understood that the present disclosure is not limited to the specific embodiment disclosed, and that the amended forms and other embodiments are intended to be included in the scope of the accompanying claims. Specific terms are used in the specification, and are used not for limitation purpose but simply with general and explanatory meanings.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A cable holding member comprising:

an insulated main body;

a through-hole;

a bend portion; and an insulated cover portion, wherein the through-hole is configured to allow a cable to be inserted therethrough from one end side toward the other end side of the insulated main body, the insulated cover portion is configured to be bendable along the bend portion relative to the insulated main body, at least a part of the insulated cover portion is configured to, upon the insulated cover portion being bent relative to the insulated main body, be capable of covering a plane intersecting with a direction where the cable is inserted, at an opening end face of an opening portion of the through-hole, the opening end face being located on the other end side, or a vicinity of the opening end face in the direction where the cable is inserted, at least the part of the insulated cover portion is configured to cover the entirety of the opening end face when viewed from the other end side, upon the insulated cover portion being bent relative to the insulated main body, the insulated main body includes a latch portion, the insulated cover portion includes a cantilever elastic piece having a latched portion, and it is configured in such a manner that upon the insulated cover portion being bent relative to the insulated main body, the cantilever elastic piece is elastically displaced at least in a direction along the direction where the cable is inserted, and the latched portion is capable of being latched to the latch portion.

2. A cable connector device comprising:

an insulated housing;

a terminal;

an insulated terminal support;

the cable holding member according to claim 1;

a shell; and an insertion hole, wherein the insulated terminal support is configured to support the terminal and be capable of being mounted on the insulated housing, the shell is configured to cover outer surfaces of the insulated housing, and the insulated terminal support and the cable holding member, which are mounted on the insulated housing, and the insertion hole is provided in the cable holding member, and is configured to communicate with the through-hole in the cable holding member and allow a part of the terminal to be inserted into the insertion hole.

3. The cable holding member according to claim 1, wherein the cable is mounted in the through-hole so that an end face of the cable is located at the opening end face or the vicinity of the opening end face in the direction where the cable is inserted.

4. The cable holding member according to claim 1, wherein the insulated cover portion is formed as a part of the insulated main body, and includes a first portion extending along a first direction, and a second portion extending along a second direction, and the first portion and the second portion have an approximate L shape in at least any cross section of the insulated cover portion, the cross section being orthogonal to a direction along the bend portion.

5. The cable holding member according to claim 4, wherein the through-hole includes a cable mounting portion where the cable is mounted, it is configured in such a manner that upon the insulated cover portion being bent relative to the insulated main body, the first portion is capable of covering the entirety of the opening end face when viewed from the other end side, and the second portion is capable of covering the cable mounting portion, the first portion includes an outer wall portion, a first piece portion, and a second piece portion, the outer wall portion extends along the first direction, the first piece portion extends from the outer wall portion along the second direction, the second piece portion extends from a distal end of the first piece portion along the first direction, the first portion includes a portion having an approximate C shape formed by the outer wall portion, the first piece portion, and the second piece portion, in at least any cross section of the first portion, the cross section being orthogonal to the direction along the bend portion, a gap is formed in a direction along the first direction between the second portion and an end face of the second piece portion, and the end face of the second piece portion is configured to function as the latched portion.

6. The cable holding member according to claim 5, wherein the insulated main body include a convex body, the convex body is provided in such a manner as to project beyond the opening end face in the direction along the direction where the cable is inserted, and includes a main portion having the latch portion, and projection portions, the projection portions are provided in such a manner as to sandwich the main portion in the direction along the bend portion and project beyond the main portion in the direction along the direction where the cable is inserted, and it is configured in such a manner that the projection portions and the outer wall portion are capable of coming into contact with each other upon the insulated cover portion being bent relative to the insulated main body.

7. The cable holding member according to claim 6, wherein the convex body includes a support portion, and the support portion is configured to support the projection portion in a direction orthogonal to both of the direction along the direction where the cable is inserted and the direction along the bend portion.

8. The cable holding member according to claim 7, wherein the support portion is provided over an area including the cable mounting portion, in the direction along the direction where the cable is inserted.

9. The cable holding member according to claim 6, wherein the second portion includes a through-hole penetrating the second portion in a thickness direction, and it is configured in such a manner that upon the insulated cover portion being bent relative to the insulated main body, at least a part of the convex body overlaps with at least a part of an area of the through-hole in a plane formed by the direction where the cable is inserted and the direction along the bend portion.

* * * * *